US012203610B2

(12) United States Patent
Ostrander

(10) Patent No.: US 12,203,610 B2
(45) Date of Patent: Jan. 21, 2025

(54) LIGHT ENGINE AND METHOD OF SIMULATING A FLAME

(71) Applicant: Marche International LLC, Lawrence, KS (US)

(72) Inventor: Christopher J. Ostrander, Lawrence, KS (US)

(73) Assignee: Marche International LLC, Lawrence, KS (US)

( * ) Notice: Subject to any disclaimer, the term of this patent is extended or adjusted under 35 U.S.C. 154(b) by 0 days.

(21) Appl. No.: 18/323,778

(22) Filed: May 25, 2023

(65) Prior Publication Data

US 2023/0296218 A1 Sep. 21, 2023

Related U.S. Application Data

(63) Continuation of application No. 17/453,927, filed on Nov. 8, 2021, now Pat. No. 11,662,072, which is a (Continued)

(51) Int. Cl.
*F21S 10/04* (2006.01)
*F21Y 107/50* (2016.01)

(Continued)

(52) U.S. Cl.
CPC ............ *F21S 10/043* (2013.01); *H05B 45/10* (2020.01); *F21Y 2107/50* (2016.08); *F21Y 2115/10* (2016.08)

(58) Field of Classification Search
None
See application file for complete search history.

(56) References Cited

U.S. PATENT DOCUMENTS 2,364,539 A 12/1944 Link
5,379,200 A 1/1995 Echard (Continued)

FOREIGN PATENT DOCUMENTS

CA 2335401 A1 8/2001
CA 3010527 A1 11/2016

(Continued)

OTHER PUBLICATIONS

Eastern Voltage Research, Digital LED Flame 1.0 Kit, www.easternvoltageresearch.com/digitalflame10.html, 2 pages.—Applicant Admitted Prior Art.

(Continued)

*Primary Examiner* — Crystal L Hammond
(74) *Attorney, Agent, or Firm* — AVEK IP, LLC

(57) ABSTRACT

A lighting device has a power interface and a control circuit in communication with a program and the LEDs to simulate a flame. The program determines a first group of LED control integers to simulate a perpetual middle with a perpetual middle center and a perpetual middle range within which one or more of the LEDs are to be at least partially actuated. At least one LED is actuated based on the first group of LED control integers. A first target for simulating movement of the perpetual middle center toward the first target and a first acceleration value is defined. The program determines a second group of LED control integers based on the first target and the first acceleration value such that the perpetual middle center becomes closer to the first target. One or more of the LEDs is actuated based on the second group of LED control integers.

20 Claims, 29 Drawing Sheets

Related U.S. Application Data continuation of application No. 16/943,966, filed on Jul. 30, 2020, now Pat. No. 11,168,855, which is a continuation-in-part of application No. 16/725,492, filed on Dec. 23, 2019, now Pat. No. 10,907,787, which is a continuation-in-part of application No. 16/164,374, filed on Oct. 18, 2018, now Pat. No. 10,514,141.

(51) Int. Cl.

| | |
|---|---|
| ***F21Y 115/10*** | (2016.01) |
| ***H05B 45/10*** | (2020.01) |

(56) References Cited

U.S. PATENT DOCUMENTS

| | | | | |
|---|---|---|---|---|
| 5,924,784 | A | 7/1999 | Chliwnyj et al. | |
| 6,053,622 | A | 4/2000 | Horowitz et al. | |
| 6,198,229 | B1 | 3/2001 | McCloud et al. | |
| 6,218,785 | B1 | 4/2001 | Incerti | |
| 6,241,362 | B1 | 6/2001 | Morrison | |
| 6,595,676 | B2 | 7/2003 | Douglas | |
| 6,685,574 | B2 | 2/2004 | Hall | |
| 6,688,752 | B2 | 2/2004 | Moore | |
| 6,720,745 | B2 | 4/2004 | Lys et al. | |
| 6,802,782 | B2 | 10/2004 | Hall et al. | |
| 6,926,423 | B2 | 8/2005 | Bucher et al. | |
| 6,953,401 | B2 | 10/2005 | Starr | |
| 7,052,159 | B2 | 5/2006 | Wu | |
| 7,125,142 | B2 | 10/2006 | Wainwright | |
| 7,201,500 | B2 | 4/2007 | Mishan | |
| 7,210,256 | B2 | 5/2007 | Rosserot | |
| 7,261,455 | B2 | 8/2007 | Schnuckle et al. | |
| 7,300,179 | B1 | 11/2007 | LaDuke et al. | |
| 7,476,002 | B2 | 1/2009 | Wolf et al. | |
| 7,553,051 | B2 | 6/2009 | Brass et al. | |
| 7,686,471 | B2 | 3/2010 | Reichow | |
| 7,762,897 | B2 | 7/2010 | Starr et al. | |
| 8,033,681 | B2 | 10/2011 | Brass et al. | |
| 8,157,425 | B2 | 4/2012 | Gutstein et al. | |
| 8,256,935 | B1 | 9/2012 | Cullimore et al. | |
| 8,371,740 | B2 | 2/2013 | Pestl et al. | |
| 8,562,184 | B2 | 10/2013 | Klipstein et al. | |
| 8,696,166 | B2 | 4/2014 | Patton et al. | |
| 8,721,121 | B1 | 5/2014 | Briles | |
| 8,789,963 | B2 | 7/2014 | Whitfield et al. | |
| 9,068,706 | B2 | 6/2015 | Fournier et al. | |
| 9,095,782 | B2 | 8/2015 | Kaplan | |
| 9,335,014 | B2 | 5/2016 | Patton et al. | |
| 9,360,181 | B2 | 6/2016 | Li | |
| 9,371,973 | B2 | 6/2016 | Li | |
| 9,423,120 | B2 | 8/2016 | Fang | |
| 9,534,956 | B2 | 1/2017 | Paolini et al. | |
| 9,551,470 | B2 | 1/2017 | Li et al. | |
| 9,605,824 | B1 | 3/2017 | Li | |
| 9,664,349 | B1 | 5/2017 | Hurduc et al. | |
| 9,689,544 | B2 | 6/2017 | Green, Jr. et al. | |
| 9,719,643 | B1 | 8/2017 | Cheng | |
| 10,125,937 | B2 | 11/2018 | Green, Jr. et al. | |
| 10,184,627 | B2 | 1/2019 | Wei | |
| 10,240,736 | B2 | 3/2019 | Green, Jr. et al. | |
| 10,436,401 | B2 | 10/2019 | Lee | |
| 10,480,734 | B2 | 11/2019 | Green et al. | |
| 10,514,141 | B1 | 12/2019 | Ostrander | |
| 10,907,787 | B2 | 2/2021 | Ostrander | |
| 10,976,019 | B2 | 4/2021 | Green et al. | |
| 11,009,201 | B1 | 5/2021 | Liao | |
| 11,118,746 | B1 | 9/2021 | Cao | |
| 11,168,855 | B2 | 11/2021 | Ostrander | |
| 11,484,617 | B2 | 11/2022 | Li | |
| 11,486,555 | B2 | 11/2022 | Li | |
| 2001/0033488 | A1 | 10/2001 | Chliwnyj et al. | |
| 2003/0072154 | A1 | 4/2003 | Moore | |
| 2003/0161145 | A1 | 8/2003 | Liu et al. | |
| 2004/0212321 | A1 | 10/2004 | Lys et al. | |
| 2005/0007779 | A1 | 1/2005 | Nozawa et al. | |
| 2005/0162851 | A1 | 7/2005 | Kazar et al. | |
| 2005/0169812 | A1* | 8/2005 | Helf | G02B 6/0068 422/123 |
| 2005/0254242 | A1 | 11/2005 | Baker | |
| 2006/0119287 | A1 | 6/2006 | Campbell et al. | |
| 2006/0119422 | A1 | 6/2006 | Sakurai et al. | |
| 2006/0208666 | A1 | 9/2006 | Johnson | |
| 2006/0208667 | A1 | 9/2006 | Lys et al. | |
| 2008/0112154 | A1 | 5/2008 | Reichow | |
| 2008/0129226 | A1 | 6/2008 | Dewitt et al. | |
| 2008/0130266 | A1 | 6/2008 | Dewitt et al. | |
| 2009/0080871 | A1 | 3/2009 | Chiu | |
| 2009/0126241 | A1 | 5/2009 | Asofsky | |
| 2009/0313866 | A1 | 12/2009 | Wang | |
| 2010/0124050 | A1 | 5/2010 | Hau et al. | |
| 2010/0264852 | A1 | 10/2010 | Julio | |
| 2011/0019422 | A1 | 1/2011 | Schnuckle et al. | |
| 2011/0057582 | A1 | 3/2011 | Sekulovski et al. | |
| 2011/0255272 | A1 | 10/2011 | Privas | |
| 2013/0033195 | A1 | 2/2013 | Liao | |
| 2013/0100686 | A1* | 4/2013 | Patton | F21V 17/02 362/392 |
| 2014/0036511 | A1 | 2/2014 | Whitfield et al. | |
| 2014/0104820 | A1 | 4/2014 | Chiang | |
| 2014/0168946 | A1 | 6/2014 | Kaplan | |
| 2014/0268704 | A1 | 9/2014 | Yang | |
| 2014/0307426 | A1 | 10/2014 | Whitfield et al. | |
| 2015/0009131 | A1 | 1/2015 | Li et al. | |
| 2015/0010309 | A1 | 1/2015 | Li et al. | |
| 2015/0308630 | A1 | 10/2015 | Bendtsen et al. | |
| 2015/0308633 | A1 | 10/2015 | Ven et al. | |
| 2015/0338042 | A1 | 11/2015 | Patton | |
| 2016/0057829 | A1* | 2/2016 | Li | F21V 23/06 315/313 |
| 2016/0109083 | A1 | 4/2016 | Li | |
| 2016/0298816 | A1 | 10/2016 | Fang | |
| 2016/0327227 | A1 | 11/2016 | Green, Jr. et al. | |
| 2016/0366746 | A1 | 12/2016 | Ven et al. | |
| 2016/0377248 | A1 | 12/2016 | Jagt et al. | |
| 2017/0159900 | A1 | 6/2017 | Gerson et al. | |
| 2017/0307157 | A1* | 10/2017 | Green, Jr. | H05B 47/16 |
| 2017/0307159 | A1 | 10/2017 | Li | |
| 2017/0311404 | A1 | 10/2017 | Li | |
| 2017/0343197 | A1 | 11/2017 | Gammons et al. | |
| 2018/0135821 | A1 | 5/2018 | Wei | |
| 2018/0163937 | A1 | 6/2018 | Lee | |
| 2020/0355336 | A1 | 11/2020 | Ostrander | |
| 2021/0254805 | A1 | 8/2021 | Green et al. | |
| 2022/0057057 | A1 | 2/2022 | Ostrander | |

FOREIGN PATENT DOCUMENTS

| | | | |
|---|---|---|---|
| CN | 1027210 | C | 12/1994 |
| CN | 2639682 | Y1 | 9/2004 |
| CN | 201034248 | Y1 | 3/2008 |
| CN | 201304248 | Y1 | 9/2009 |
| CN | 201496785 | U | 6/2010 |
| CN | 101865413 | A | 10/2010 |
| CN | 201715440 | U | 1/2011 |
| CN | 201944772 | U | 8/2011 |
| CN | 202221029 | U | 5/2012 |
| CN | 202868827 | U | 4/2013 |
| CN | 203082789 | U | 7/2013 |
| CN | 203190294 | U | 9/2013 |
| CN | 103867931 | A | 6/2014 |
| CN | 203771092 | U | 8/2014 |
| CN | 203940345 | U | 11/2014 |
| CN | 203980133 | U | 12/2014 |
| CN | 104266136 | A | 1/2015 |
| CN | 204153691 | U | 2/2015 |
| CN | 204268354 | U | 4/2015 |
| CN | 104728762 | A | 6/2015 |
| CN | 204554684 | U | 8/2015 |
| CN | 108167765 | A | 6/2018 |
| CN | 208312231 | U | 1/2019 |
| CN | 208779348 | U | 4/2019 |
| CN | 110099487 | A | 8/2019 |
| CN | 110173655 | A | 8/2019 |

(56) References Cited

FOREIGN PATENT DOCUMENTS

| | | | |
|---|---|---|---|
| CN | 110005995 | B | 5/2021 |
| CN | 110131659 | B | 5/2021 |
| DE | 2020120042100 | U | 8/2012 |
| DE | 202018100182 | U1 | 1/2018 |
| EP | 3293444 | A1 | 3/2018 |
| EP | 3604901 | A1 | 2/2020 |
| EP | 3641503 | A1 | 4/2020 |
| GB | 2462848 | A | 2/2010 |
| GB | 2554382 | B | 7/2021 |
| KR | 200469393 | Y1 | 10/2013 |
| WO | 2014068440 | A1 | 5/2014 |
| WO | 2016155521 | A1 | 10/2016 |
| WO | 2016177021 | A1 | 11/2016 |
| WO | 2017084165 | A1 | 5/2017 |
| WO | 2018055386 | A1 | 3/2018 |

OTHER PUBLICATIONS

English Abstract from Espacenet of 204554684, CN, Kind Code U, Published Aug. 12, 2015, Mumedia Photoelectric, Ltd. (This is a publication of CN 2015/20282857.7 filed May 5, 2015 from which priority is claimed).

Equinox, Flame Machine User Manual, Equinox RGB 1.5M DMX Flame Machine (FLAM11) 12 pages—Applicant Admitted Prior Art.

European Search Report, dated Nov. 15, 2019, 2 pages, issued in EP Application No. 19193556.

Extended European Search Report, dated Feb. 9, 2018, 7 pages, issued in EP Application No. 16789015.1.

First Search dated Apr. 22, 2016, 1 page, issued in CN Application No. 2015101528372.

International Search Report, dated Apr. 21, 2016, 2 pages, issued in PCT Application No. PCT/CN2016/071583.

Non-Final Office Action, dated Apr. 30, 2020, 9 pages, issued in U.S. Appl. No. 16/725,492.

Non-Final Rejection, dated Mar. 29, 2018, 8 pages, issued in U.S. Appl. No. 15/571,858.

Notice of Allowance, dated Jan. 17, 2019, 7 pages, issued in U.S. Appl. No. 16/137,433.

Notice of Allowance, dated Sep. 22, 2020, 13 pages, issued in U.S. Appl. No. 16/725,492.

Paralax Inc., BlinkM Smart LED product on website, www.parallax.com/product/32325, 4 pages.

Parallax Inc., BlinkM Smart LED product on website, www.digikey.com/product-detail/en/parallax-inc/32325/32325-ND/3974652, 2 pages—Applicant Admitted Prior Art.

ThingM Labs, BlinkM Datasheet for BlinkM & BlinkM MinM MaxM (2010) 50 pages, blinkm.thingm.com.

Website showing Realistic Flickering Flame Effect with Arduino and LED's, www.instructables.com/id/Realistic-Fire-Effect-with-Arduino-and-LEDs, 10 pages—Applicant Admitted Prior Art.

* cited by examiner

LIGHT ENGINE AND METHOD OF SIMULATING A FLAME

CROSS REFERENCE TO RELATED APPLICATIONS

This application is a continuation of U.S. patent application Ser. No. 17/453,927, filed Nov. 8, 2021, which is a continuation of U.S. patent application Ser. No. 16/943,966, filed Jul. 30, 2020, now U.S. Pat. No. 11,168,855, which is a continuation-in-part of U.S. patent application Ser. No. 16/725,492, filed on Dec. 23, 2019, now U.S. Pat. No. 10,907,787, which is a continuation-in-part of U.S. patent application Ser. No. 16/164,374, filed on Oct. 18, 2018, now U.S. Pat. No. 10,514,141, the disclosures of each of which is incorporated by reference in its entirety herein.

FIELD OF THE DISCLOSURE

The present invention relates to lighting and, in particular, to apparatus, systems, and methods for producing lighting and lighting effects that simulate the appearance of a flame or flames.

SUMMARY

The following represents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form a prelude to the more detailed description that is presented elsewhere.

According to one embodiment of the invention, a lighting device includes a housing with a shroud and a base. The shroud includes an emission area. A plurality of LEDs is encased in the shroud for emitting light through the emission area. A power interface transmits electricity to the plurality of LEDs, and a control circuit in communication with each of the LEDs causes the plurality of LEDs to simulate a flame. Specifically, the control circuit (i) uses an initial fuel value to determine an actuation value (A1) for a lowermost grouping of the LEDs; (ii) uses the initial fuel value to determine an actuation value (B1) for a second grouping of the LEDs; and (iii) uses the initial fuel value to determine an actuation value (C1) for a third grouping of the LEDs. The second grouping of the LEDs are upwardly adjacent the lowermost grouping of the LEDs, and the third grouping of the LEDs are upwardly adjacent the second grouping of the LEDs. The control circuit further: (iv) uses a second fuel value to determine an actuation value (A2) for the lowermost grouping of the LEDs; (v) uses the second fuel value to determine an actuation value (B2) for the second grouping of the LEDs; and (vi) uses a third fuel value to determine an actuation value (A3) for the lowermost grouping of the LEDs. The control circuit (vii) at time T1, actuates the lowermost grouping of the LEDs in accordance with the actuation value (A1); (viii) at time T2: actuates the lowermost grouping of the LEDs in accordance with the actuation value (A2), and actuates the second grouping of the LEDs in accordance with the actuation value (B1); and (ix) at time T3: actuates the lowermost grouping of the LEDs in accordance with the actuation value (A3), actuates the second grouping of the LEDs in accordance with the actuation value (B2), and actuates the third grouping of the LEDs in accordance with the actuation value (C1). Time T1 occurs before time T2, and time T2 occurs before time T3.

According to another embodiment of the invention, a lighting device includes a housing with a shroud and a base. The shroud includes an emission area. A plurality of LEDs is encased in the shroud for emitting light through the emission area. A power interface transmits electricity to the plurality of LEDs, and a control circuit in communication with each of the LEDs causes the plurality of LEDs to simulate a flame. Specifically, the control circuit (i) determines a midpoint of the simulated flame based on an initial fuel value; (ii) uses an initial distance between the midpoint of the simulated flame and a lowermost grouping of the LEDs to determine an actuation value (A0') for the lowermost grouping of the LEDs and actuates the lowermost grouping of the LEDs in accordance with the actuation value (A0'); (iii) uses a second distance between the midpoint of the simulated flame and a second grouping of the LEDs to determine an actuation value (B0') for the second grouping of the LEDs and actuates the second grouping of the LEDs; and (iv) uses a third distance between the midpoint of the simulated flame and a third grouping of the LEDs to determine an actuation value (C0') and actuates the third grouping of the LEDs. The second grouping of the LEDs are upwardly adjacent the lowermost grouping of the LEDs.

According to still another embodiment of the invention, a lighting device includes a housing with a shroud and a base. The shroud includes an emission area. A plurality of LEDs is encased in the shroud for emitting light through the emission area. A power interface transmits electricity to the plurality of LEDs, and a control circuit in communication with each of the LEDs causes the plurality of LEDs to simulate a flame. Specifically, the control circuit (i) determines a midpoint of the simulated flame using an initial fuel value; the midpoint defining a first grouping of LEDs, and having a first actuation value; (ii) uses the midpoint to determine a second actuation value of a second grouping of LEDs arranged downwardly from the midpoint; and (iii) uses the midpoint to determine a third actuation value of a third grouping of LEDs arranged upwardly from the midpoint. The control circuit may further (iv) actuates the respective first, second, and third grouping of LEDs in accordance with the respective first, second, and third actuation values. The respective actuation values are dependent on distances between the midpoint and the respective grouping of LEDs. An intensity of the light from the respective groupings of LEDs decreases outwardly from the midpoint.

According to still yet another embodiment of the invention, a lighting device includes a housing with a shroud and a base. The shroud includes an emission area. A plurality of LEDs is encased in the shroud for emitting light through the emission area. A power interface transmits electricity to the plurality of LEDs, and a control circuit in communication with each of the LEDs causes the plurality of LEDs to simulate a flame. Specifically, the control circuit (i) uses an initial distance to an initial wind point to determine actuation values for each LED in a first grouping of the LEDs and actuates the first grouping of the LEDs in accordance with the actuation values; and (ii) uses a second distance to a second wind point to determine actuation values for each LED in a second grouping of the LEDs and actuates the second grouping of the LEDs in accordance with the actuation values.

According to a further embodiment of the invention, a lighting device includes a plurality of LEDs. A power interface transmits electricity to the plurality of LEDs, and a control circuit in communication with each of the LEDs causes the plurality of LEDs to simulate a flame. Specifically, the control circuit (i) assigns a fuel value to a grouping of LEDs; (ii) assigns a wind point of the grouping of LEDs; and (iii) determines an actuation value for each LED in the grouping of LEDs. The actuation value is based on the fuel value and a distance of the LED to the wind point. The control circuit further (iv) actuates each LED in the grouping of the LEDs in accordance with the actuation value for each LED.

According to still another embodiment of the invention, a lighting device includes a plurality of discrete light emission points (DLEPs). A power interface transmits electricity to the plurality of discrete light emission points, and a control circuit in communication with each of the discrete light emission points causes the plurality of discrete light emission points to simulate a flame. Specifically, the control circuit (i) uses an initial value to determine an actuation value (A1) for a first grouping of DLEPs and actuates the first grouping of the DLEPs in accordance with the actuation value (A1); and uses the initial value to determine an actuation value (B1) for a second grouping of the DLEPs and actuates the second grouping of the DLEPs in accordance with the actuation value (B1). The actuation of the second grouping of DLEPs occurs after the actuation of the first grouping of DLEPs.

In still a further embodiment of the invention, a lighting device has a power interface and a control circuit in communication with a program and the LEDs to simulate a flame. The program determines a first group of LED control integers to simulate a perpetual middle with a perpetual middle center and a perpetual middle range within which one or more of the LEDs are to be at least partially actuated. At least one LED is actuated based on the first group of LED control integers. A first target for simulating movement of the perpetual middle center toward the first target and a first acceleration value is defined. The program determines a second group of LED control integers based on the first target and the first acceleration value such that the perpetual middle center becomes closer to the first target. One or more of the LEDs is actuated based on the second group of LED control integers.

According to yet another embodiment of the invention, a lighting device, includes a plurality of LEDs for emitting light; a power interface for transmitting electricity to the plurality of LEDs; and a control circuit in communication with a program and each of the LEDs to cause the plurality of LEDs to simulate a flame. The program determines a first group of LED control integers for simulating a perpetual middle with a perpetual middle center and a perpetual middle range within which one or more of the LEDs are to be at least partially actuated. The program further determines a second group of LED control integers for simulating a spark with a spark center and a spark range within which one or more of the LEDs are to be at least partially actuated. A value for wind speed within a wind speed range is set. The program determines a third group of LED control integers by adding the first group of LED control integers to the second group of LED control integers, wherein the third group of LED control integers is further based on the wind speed value. A first value for wind speed target and a first value for wind speed acceleration is set. The program determines a fourth group of LED control integers for simulating a change in brightness of the perpetual middle based on the first value for wind speed acceleration, a fifth group of LED control integers for simulating a change in brightness of the spark based the first value for wind speed acceleration, and a sixth group of LED control integers by adding the fourth group of LED control integers to the fifth group of LED control integers. The program then actuates one or more of the LEDs based on the sixth group of LED control integers.

DETAILED DESCRIPTION

Many embodiments are described herein in the context of devices called light engines or modules that may have the form factor of a light bulb with a threaded base that can be threaded into a conventional light bulb socket to provide electrical power. Therefore, embodiments can be substituted in virtually any light fixture that has such a socket. It is to be understood, however, that embodiments can take a variety of other forms. Embodiments can be scaled up or down within practical limits and do not have to be packaged with a conventional (e.g., threaded) light bulb base. Different interfaces to electrical power and different mounts in a fixture are of course possible within the current disclosure.

Further, the disclosure is not necessarily limited to solid-state light sources (which give off light by solid state electroluminescence rather than thermal radiation or fluorescence); other types of light sources may be driven in a similar regimen. And solid-state sources (e.g., LEDs, OLEDS, PLEDs, and laser diodes) themselves can vary. In one embodiment, the light source may be a red-green-blue (RGB) type LED comprising 5 wire connections (+, −, r, g, b). In another embodiment, the light source may be a red-green-blue-white (RGBW) type LED comprising 6 wire connections (+, −, r, g, b, w). In still another embodiment, the light source may be a single-color type LED which may be, in addition to red/green/blue/white, orange/warm white with a low color temperature of less than or equal to 4000 Kelvin, or bluish/cold white with a high color temperature of more than 4000 Kelvin. In embodiments, one or more light sources, individually or in combination, may be controlled and actuated with a controller, a control data line, a power line, a communication line, or any combination of these parts. In another embodiment, two groups of single color light sources (e.g., warm/orange color LEDs and cold/bluish color LEDs) may be arranged in an alternating pattern, and could be controlled and actuated with or without a control data line. For example, one acceptable type of LED is the NeoPixel® by Adafruit. In one embodiment, one or more light sources, individually or in combination, may be mounted on or into substrates which can be either rigid or flexible. In another embodiment, one or more light sources, individually or in combination, may be rigidly or flexibly connected by a power line, a data control line, a communication line, or any combination of them. Accordingly, while LEDs are used in the examples provided herein, it shall be understood that an LED can be any discrete light emission point including but not limited to LEDs or other light sources which are now known or later developed.

Figure 1:
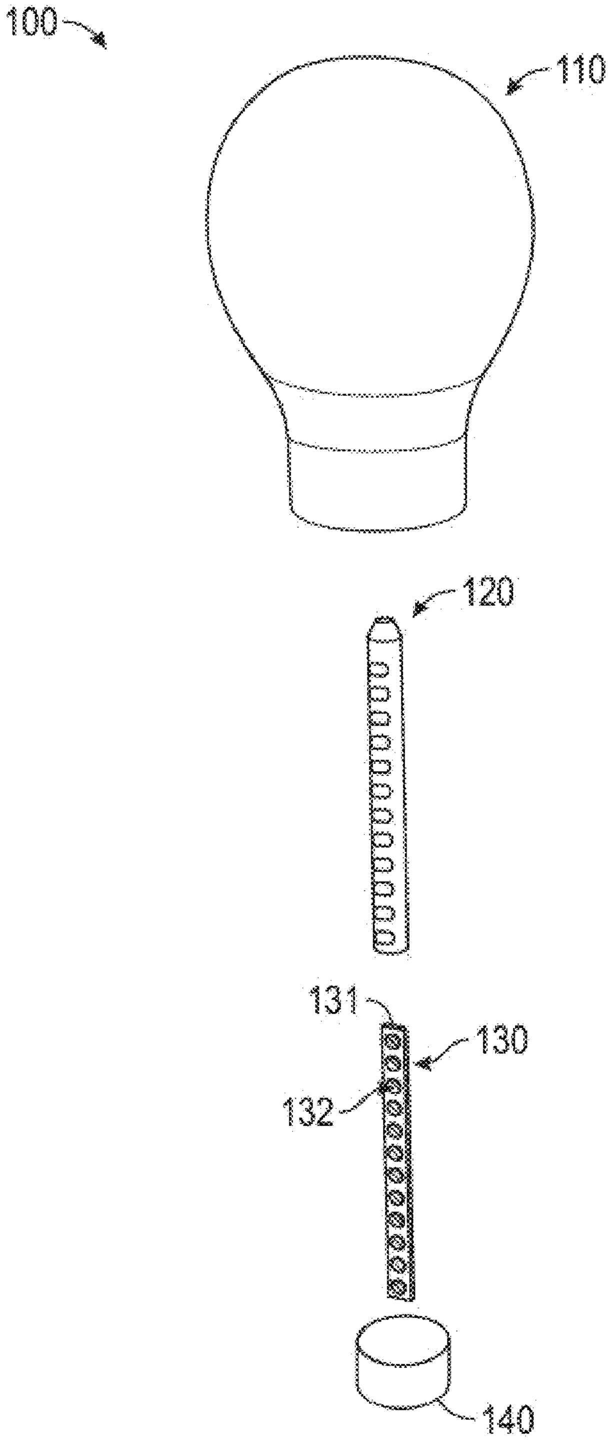
FIG. 1 is an exploded view of a lighting device according to one exemplary embodiment of the invention.

FIG. 1 shows an exemplary embodiment of a lighting device 100 according to the present invention. The lighting device 100 comprises a clear lens 110, which may have pattern(s) and acts as a shroud having an emission area and covers the inner apparatus. The lighting device further comprises a semi translucent diffusor 120, which can disperse "hot spots" of light-emitting diode (LED) lights 132 and whose surface can facilitate the flame effect. The lighting device 100, may further comprise an LED strip 130 consisting of a substrate 131 and a plurality of LEDs lights 132 mounted on or in the substrate 131 for emitting light through the emission area of the shroud 110. Lastly, the lighting device 100 comprises a control module 140, which itself acts as a base and comprises a microprocessor and related circuitry for controlling electric current received from a light socket or a battery.

The control module 140 is in communication with each of the plurality of LEDs and drives them individually, in combination, or all to cause lighting effects such as simulating a flame or flames. The lighting device 100 may further comprise a power interface for transmitting electricity to the plurality of LEDs. In the embodiment shown in FIG. 1, the clear lens 110 acts as a shroud and the control module 140 acts as a base, together forming the housing of the lighting device 100. In another embodiment, the lighting device may further comprise a separate outer shell housing comprising a shroud with an emission area and a base. In another embodiment, the lighting device may comprise LEDs and a control module with or without a shroud and/or a base.

Figure 2A:
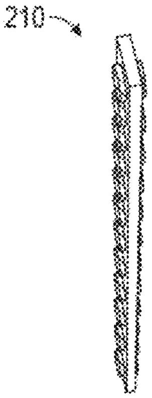
FIG. 2A is an LED strip with a three-dimensional substrate and a plurality of LEDs mounted in one pattern.
Figure 2B:
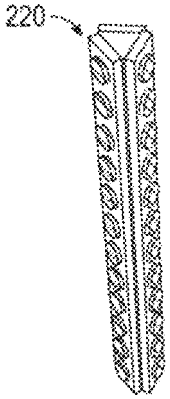
FIG. 2B is an LED strip with another three-dimensional substrate and a plurality of LEDs mounted in another pattern.
Figure 2C:
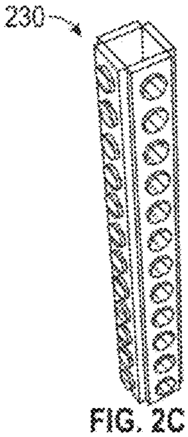
FIG. 2C is an LED strip with another three-dimensional substrate and a plurality of LEDs mounted in another pattern.
Figure 2D:
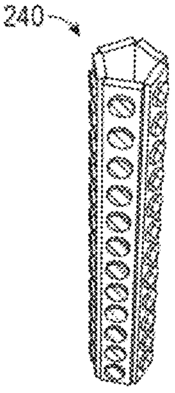
FIG. 2D is an LED strip with another three-dimensional substrate and a plurality of LEDs mounted in another pattern.
Figure 2E:
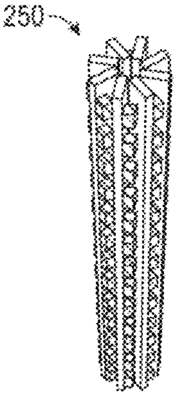
FIG. 2E is an LED strip with another three-dimensional substrate and a plurality of LEDs mounted in another pattern.
Figure 2F:
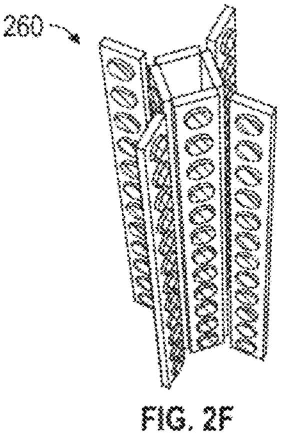
FIG. 2F is an LED strip with another three-dimensional substrate and a plurality of LEDs mounted in another pattern.
Figure 2G:
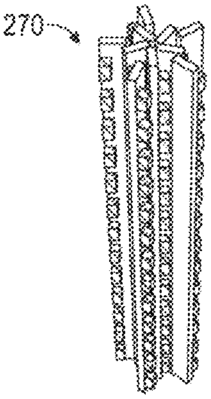
FIG. 2G is an LED strip with another three-dimensional substrate and a plurality of LEDs mounted in another pattern.
Figure 2H:
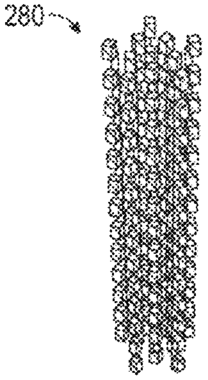
FIG. 2H is an LED strip with another three-dimensional substrate and a plurality of LEDs mounted in another pattern.

FIGS. 2A-2H show different layout options of LED strips 130. In FIGS. 2A to 2G; the plurality of LEDs is mounted to substrates such as boards or strips. FIG. 2H shows an alternative embodiment wherein the plurality of LEDs is directly connected by clear wire without using any mounting boards or strips. It is to be understood that either pattern or combination of patterns may be utilized in constructing a working embodiment in the present invention. It is to be further understood that while only single LED strips with different patterns of substrates and mounted LEDs are shown, multiple LED strip may be further combined together to function as a single lighting device.

Figure 3A:
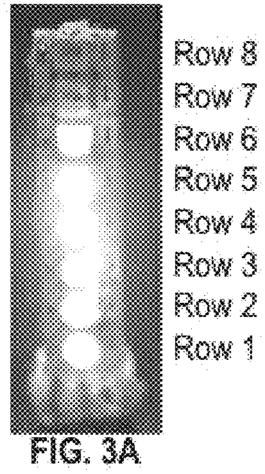
FIG. 3A is an LED strip with eight rows of LEDs according to one exemplary embodiment of the invention.
Figure 3B:
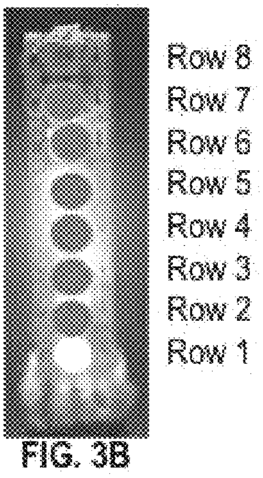
FIG. 3B is an exemplary row 1 illumination of an LED strip with eight rows of LEDs according to one exemplary embodiment of the invention.

FIGS. 3A-3H illustrate an operation method of simulating a flame generated from a specific type of fuel source, in this case, gas. FIG. 3A shows an exemplary lighting device consisting of eight rows of LED lights aligned vertically on top of each other. Further as shown in FIG. 3B, an initial fuel value corresponding to a specific type of fuel source is determined for the first row of LEDs. The initial fuel value may be generated automatically or entered manually by a user, and may be a number (for instance, 175) between a predetermined range for a particular fuel source (for instance, 35 and 256). In an embodiment, each LED is RGBW type and has respective red, green, blue, and white illumination parts. Each illumination part is given a value between 0 and 256, with 0 corresponding to off, or zero illumination, and 256 corresponding to maximum brightness or illumination. The illumination parts of each LED in an LED strip may be selectively activated by assigning values thereto in accordance with the invention. The assigned values of each of the illumination parts of each LED may be based on a desired aesthetic, as will be described in greater detail below. Moreover, each LED in the LED strip may be individually activated (e.g., independent of other LEDs) or may be activated as part of a grouping of LEDs.

For example, FIGS. 3B-3I illustrate an LED strip undergoing a process for the eventual illumination of the 8 rows of LEDs which occurs over a period of time in order to simulate a gas flame. In FIG. 3B, at time T1, the row 1 grouping of LEDs is illuminated to represent the blue color at the base of gas flames. To illuminate the LEDs, the LEDs are assigned an initial fuel value (e.g., 175) and, an actuation value A1 is characterized for the LEDs at row 1, which comprises values representing the brightness of each illumination part of each LED (e.g., the red, green, blue, and white portions of the LEDs). The actuation value A1 for the row 1 LEDs may be calculated according to the following code:

```
r=0;
g=fuel*0.8;
b=fuel*0.8; and
w=0.
```

The actuation value A1 actuates the LEDs in the lowermost row 1 and generally corresponds to desired characteristics of the bottom portion of the simulated gas flame (such as intensity, color, color temperature, size, diameter, pausing, and flickering) of the output light of row 1 LEDs.

Figure 3C:
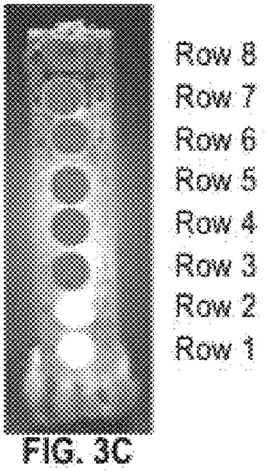
FIG. 3C is an exemplary row 2 illumination of an LED strip with eight rows of LEDs according to one exemplary embodiment of the invention.

Moving on, in FIG. 3C, at time T2 (e.g., 25 milliseconds after time T1), the original fuel value 175 is passed from row 1 LEDs to upwardly adjacent row 2 LEDs and a second fuel value is generated, optionally by a random number generator or manual entry of a user for the row 1 LEDs. Thus, the row 2 LEDs now has a fuel value of 175. The initial fuel value is passed row-by-row over a period of time all the way up to the row 8 LEDs, thus the previous fuel value of row 2 LEDs now belongs to row 3 LEDs, and so on. FIG. 3C shows the illumination of the row 2 LEDs, representing a transition between the blue gas color and the orange/yellow flame color. In order to show the transition between the blue gas color and the flame color, an actuation value B1 is characterized for the row 2 LEDs which comprises calculating the values for each illumination part using the received initial fuel value based on the following code:

```
r=fuel*0.06;
g=fuel*0.1;
b=fuel*0.1; and
w=fuel*0.06.
```

The actuation value B1 actuates the row 2 LEDs and generally corresponds to desired characteristics (such as intensity, color, color temperature, size, diameter, pausing, and flickering) of the output light of the row 2 LEDs.

Substantially simultaneously, the row 1 LEDs are actuated by a new actuation value A2 determined by the second fuel value in accordance with the process described above.

Figure 3D:
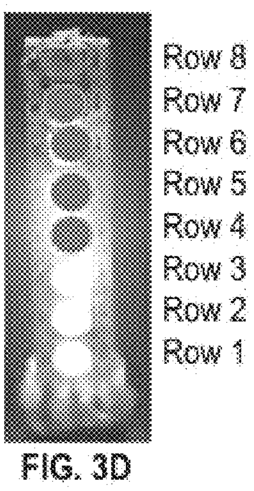
FIG. 3D is an exemplary row 3 illumination of an LED strip with eight rows of LEDs according to one exemplary embodiment of the invention.

FIG. 3D shows the illumination of the row 3 LEDs at time T3 (e.g., 25 milliseconds after time T2), which represent the beginning of the warm flame. As noted above, the original fuel value is passed from row 2 LEDs to upwardly adjacent third grouping row 3 LEDs. In this case, the row 3 LEDs are intended to be more orange than white. A new integer value (dim) may be introduced to this row to provide the flickering effect. Accordingly, an actuation value C1 is characterized for the row 3 LEDs which comprises values for each of the row 3 LEDs, and may be calculated according to the following code:

```
dim=(fuel−64)*1.32;
r=1+dim*0.2;
g=r*0.19;
if (fuel<=90) {w=0};
if (fuel>90){w=fuel*0.1}; and
b=w*0.15.
```

As shown in the codes above, depending on the selection of type of fuel source, if the selected fuel value is less than 64, the row 3 LEDs would be completely off since dim would equal 0. But, if the selected fuel value is greater than 64, the newly added integer value (dim) is used to calculate the values of red and green portions of the row 3 LEDs.

The actuation value C1 actuates the row 3 LEDs and generally corresponds to desired characteristics (such as intensity, color, color temperature, size, diameter, pausing, and flickering) of the output light of the row 3 LEDs.

Substantially simultaneously with the actuation of the row 3 LEDs, the second fuel value is passed from the row 1 LEDs to the row 2 LEDs, and a third fuel value is generated for the row 1 LEDs. The row 1 LEDs are now actuated by the new actuation value A3 determined by the third fuel value, and the row 2 LEDs are now actuated by a new actuation value B2 determined by the second fuel value.

Figure 3E:
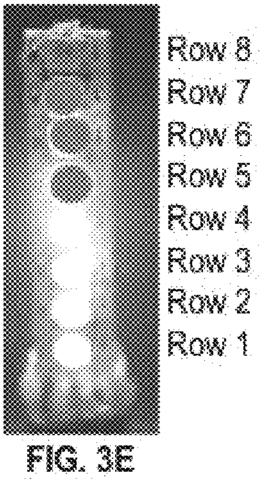
FIG. 3E is an exemplary row 4 illumination of an LED strip with eight rows of LEDs according to one exemplary embodiment of the invention.

FIG. 3E shows the illumination of the row 4 LEDs at time T4 (e.g., 25 milliseconds after time T3), which are very similar to the row 3 LEDs. Here, the calculation of the integer value (dim) may require a fuel value greater than 96, such that the flame rises above the row 3 LEDs. An actuation value D1 is characterized for the row 4 LEDs, which comprises values for each illumination portion of each of the row 4 LEDs, which may be calculated by the following code:

```
dim=(fuel−96)*1.6;
r=1+dim*1.2;
g=r*0.19;
if (fuel<=108){w=0};
if (fuel>108){w=fuel*0.35}; and
b=w*0.1.
```

The actuation value D1 actuates the row 4 LEDs and generally corresponds to desired characteristics (such as intensity, color, color temperature, size, diameter, pausing, and flickering) of the output light of the row 4 LEDs.

Similarly as described above, at time T4 (or substantially at time T4), the row 1 LEDs are actuated by an actuation value A4 determined based on a fourth fuel value, the row 2 LEDs are actuated by an actuation value B3 determined based on the third fuel value, and the row 3 LEDs are actuated by an actuation value C2 determined based on the second fuel value.

Figure 3F:
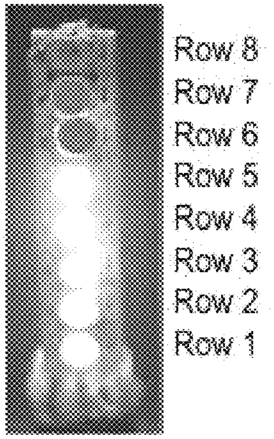
FIG. 3F is an exemplary row 5 illumination of an LED strip with eight rows of LEDs according to one exemplary embodiment of the invention.

FIG. 3F. shows the illumination of the row 5 LEDs at time T5 (e.g., 25 milliseconds after time T4). Here, the calculation of the integer value (dim) may require a fuel value greater than 128, such that the flame rises above the row 4 LEDs. An actuation value E1 is characterized for the row 5 LEDs, which comprises values for each illumination portion of each of the row 5 LEDs, which may be calculated by the following code:

```
dim=(fuel−128)*2;
r=1+dim*1.4;
g=r*0.19;
if (fuel<=150){w=dim*0.1};
if (fuel>150){w=fuel*0.35}; and
b=w*0.3.
```

The actuation value E1 actuates the row 5 LEDs and generally corresponds to desired characteristics (such as intensity, color, color temperature, size, diameter, pausing, and flickering) of the output light of row 5 LEDs.

Figure 3G:
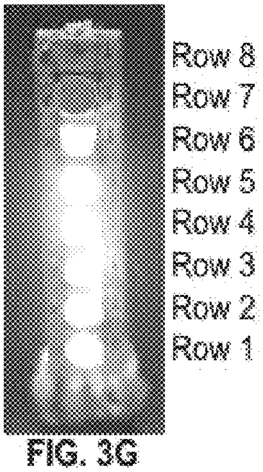
FIG. 3G is an exemplary row 6 illumination of an LED strip with eight rows of LEDs according to one exemplary embodiment of the invention.

Similarly as described above, at time T5 (or substantially at time T5), the row 1 LEDs are actuated by an actuation value A5 determined based on a fifth fuel value, the row 2 LEDs are actuated by an actuation value B4 determined based on the fourth fuel value, the row 3 LEDs are actuated by an actuation value C3 determined based on the third fuel value, and the row 4 LEDs are actuated by an actuation value D2 determined based on the second fuel value FIG. 3G. shows the illumination of the row 6 LEDs at time T6 (e.g., 25 milliseconds after time T5). Here, the calculation of the integer value (dim) may require a fuel value greater than 160, such that the flame rises above the row 5 LEDs. An actuation value F1 is characterized for the row 6 LEDs, which comprises values for each illumination portion of each of the row 6 LEDs, which may be calculated by the following code:

```
dim=(fuel−160)*2.66;
r=lim(dim*1.2);
g=r*0.19;
if (fuel<=172){w=dim*0.1};
if (fuel>172){w=fuel*0.5}; and
b=w*0.2.
```

Newly introduced "lim" is a simple function that constrains the value or r to be larger than 0 and smaller than 255. The actuation value F1 actuates the row 6 LEDs and generally corresponds to desired characteristics (such as intensity, color, color temperature, size, diameter, pausing, and flickering) of the output light of row 6 LEDs.

Similarly as described above, at time T6 (or substantially at time T6), the row 1 LEDs are actuated by an actuation value A6 determined based on a sixth fuel value, the row 2 LEDs are actuated by an actuation value B5 determined based on the fifth fuel value, the row 3 LEDs are actuated by an actuation value C4 determined based on the fourth fuel value, the row 4 LEDs are actuated by an actuation value D3 determined based on the third fuel value, and the row 5 LEDs are actuated by an actuation value E2 determined based on the second fuel value.

Figure 3H:
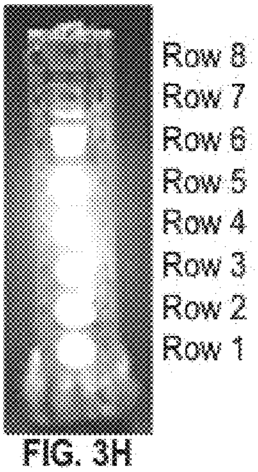
FIG. 3H is an exemplary row 7 illumination of an LED strip with eight rows of LEDs according to one exemplary embodiment of the invention.

FIG. 3H shows the illumination of the row 7 LEDs at time T7 (e.g., 25 milliseconds after time T6). Here, the calculation of the integer value (dim) may require a fuel value greater than 192, such that the flame rises above the row 6 LEDs. An actuation value G1 is characterized for the row 7 LEDs, e.g., a fuel value greater than 192 such that the flame rises higher than the row 6 LEDs. An actuation value G1 is characterized for the row 7 LEDs, which comprises values for each illumination portion of each of the row 7 LEDs, which may be calculated by the following code:

```
dim=(fuel−192)*4;
r=dim;
g=r*0.19;
if (fuel<=205){w=dim*0.08};
if (fuel>205){w=fuel*0.2}; and
b=w*0.2.
```

The actuation value G1 actuates the row 7 LEDs and generally corresponds to desired characteristics (such as intensity, color, color temperature, size, diameter, pausing, and flickering) of the output light of row 7 LEDs.

At time T7 (or substantially at time T7), the row 1 LEDs are actuated by an actuation value A7 determined based on a seventh fuel value, the row 2 LEDs are actuated by an actuation value B6 determined based on the sixth fuel value, the row 3 LEDs are actuated by an actuation value C5 determined based on the fifth fuel value, the row 4 LEDs are actuated by an actuation value D4 determined based on the fourth fuel value, the row 5 LEDs are actuated by an actuation value E3 determined based on the third fuel value, and the row 6 LEDs are actuated by an actuation value F2 determined based on the second fuel value.

Figure 3I:
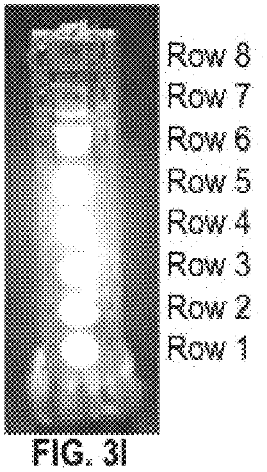
FIG. 3I is an exemplary row 8 illumination of an LED strip with eight rows of LEDs according to one exemplary embodiment of the invention.

FIG. 3I shows the illumination of the row 8 LEDs at time T8 (e.g., 25 milliseconds after time T7). Here, the calculation of the integer value (dim) may require a fuel value greater than 224, such that the flame rises above the row 7 LEDs. An actuation value H1 is characterized for the row 8 LEDs, which comprises values for each illumination portion of each of the row 8 LEDs, which may be calculated by the following code:

```
dim=(fuel−224)*8;
r=dim;
g=r*0.19;
if (fuel<=240){w=dim*0.05};
if (fuel>240){w=fuel*0.1}; and
b=w*0.1.
```

The actuation value H1 actuates the row 8 LEDs and generally corresponds to desired characteristics (such as intensity, color, color temperature, size, diameter, pausing, and flickering) of the output light of row 8 LEDs.

Substantially at time T8, the row 1 LEDs are actuated by an actuation value A8 determined based on an eighth fuel value, the row 2 LEDs are actuated by an actuation value B7 determined based on the seventh fuel value, the row 3 LEDs are actuated by an actuation value C6 determined based on the sixth fuel value, the row 4 LEDs are actuated by an actuation value D5 determined based on the fifth fuel value, the row 5 LEDs are actuated by an actuation value E4 determined based on the fourth fuel value, the row 6 LEDs are actuated by an actuation value F3 determined based on the third fuel value, and the row 7 LEDs are actuated by an actuation value G2 determined based on the second fuel value.

As described above, in order to simulate a flame by the lighting device, a fuel value is created and passed all the way up the formed LED rows. In embodiments, the fuel value is a number between 35 and 256, and is randomly generated by a random fuel value generator. Within this range, different numbers can yield different effects of simulated flames based on environmental conditions (e.g., in the wind). Such different effects may help to simulate a real flame, as real flames are susceptible to environmental conditions, such as wind. For example, if the random fuel value generator creates values between 230 and 256 for the row 1 LEDs, the flickering effects of flames would be very low because the intensity of the "flame" would be very high; however, if the random fuel value generator creates values between 100 and 256 for row 1 LEDs, the flickering effects of flames may greatly increase because the intensity of the "flame" is less. In other words, a high random fuel value number (such as 240-256) may simulate small amounts of wind while a small random fuel value number (such as 25-160) may simulate large amounts of wind.

In embodiments, different types of simulated fuel sources may correspond to different number ranges within the above 35 to 256 fuel range. Such a simulated fuel may be selected from the group consisting of: wax, paraffin, tallow, beeswax, spermaceti, stearin, gasoline, diesel, kerosene, and gel. For example, the range of fuel values of gas would be different from that of paraffin.

It is to be understood that the invention is not necessarily limited to utilizing a fuel value solely generated by a random number generator. While each new fuel value can be manually entered by a user in an alternative embodiment, the fuel value may also be generated by utilizing both a random number generator and manual entry.

It is to be further understood that time T1, T2, T3, etc. are consecutive time intervals. Although 25 milliseconds are used in the above example as the time interval, such a consecutive time interval may be any length of time period longer than 1 nanosecond. Furthermore, the time intervals may, but need not be equal. For example, T1 may be 25 milliseconds, T2 may be 30 milliseconds, etc. Or, T1 may be 25 milliseconds, and T2 may be 10 milliseconds.

It is to be further understood that while only 8 rows of LEDs are illustrated herein, the invention is not necessarily limited to 8 rows of LEDs and such a lighting device may comprise other numbers of rows of LEDs, individually or in combination, in achieving similar functions.

Figure 4:
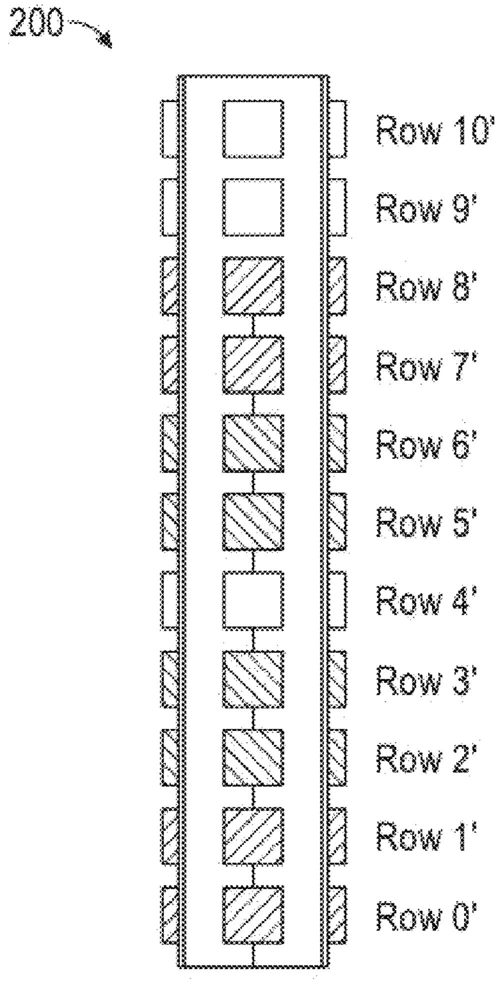
FIG. 4 is an LED strip with a three-dimensional substrate and eleven rows of LEDs mounted on it.

FIG. 4 illustrates another operation method of simulating a flame generated from a specific type of fuel source, in this case, gas, taking into account a flickering effect of the flame. FIG. 4 shows an exemplary lighting device 200 consisting of 11 rows of LED lights aligned vertically, with reference number 0' referring to the bottom row of LED lights and reference number 10' referring to the top row of LEDs. Compared with the embodiment illustrated in FIGS. 3A-3I, the embodiment in FIG. 4 may include some, or all, of the functions described above, including but not limited to generating a fuel value for the lowermost row of LEDs, subsequent rows of LEDs receiving fuel value passed from preceding lower rows of LEDs, and/or actuating LEDs in consecutive time cycles. In the embodiment shown in FIG. 4, however, a midpoint of a simulated flame is identified as the "hot zone" of the simulated flame. The "hot zone" may be configured to appear whiter and brighter than the other rows of LEDs. In FIG. 4, row 4' is the midpoint of the simulated flame at a given time and considered as the "hot zone" of the simulated flame, and thus may appears to be whiter and brighter than other rows. The rows of LEDs to the top and bottom of the midpoint hare configured to display colors that are dimmer and warmer in color than the midpoint. Generally, the farther away the row is from the midpoint, the warmer in color and dimmer in brightness are the row of LEDs along an axis in the row. For example, the LEDs in row 0' and row 8' are the warmest in color and dimmest in brightness along the axis. As will be described in detail below, in an embodiment, an extra function "setHzone" is introduced to the process of during the simulation simulating of the flame in order to find the midpoint of the final height of the rising flame, and the distance between a given row and the midpoint in order to set the appropriate actuation values for each row. The function "setHzone" may be defined as follows:

```
void setHzone (int b, int c){
    float r = b / 2 + 15;
    float s = lim (r − abs(c − r));
    hZone = s / r;
    float v = (0.0013 * pow(b, 2.2))/225;
    warmScale = m * v
}.
```

Here, b is the fuel number of a given row (which may be assigned to the row, or passed on from a previous row as described herein); c is the height of the given LED row, which is a number ranging from 1 to 255; "hZone" is a percentage value representing the distance of the given row to the midpoint of the simulated flame. A larger "hZone" value corresponds to a given row being closer to the midpoint, while a smaller "hZone" value corresponds to a given row being farther away from the midpoint. In this case, "warmScale" is used to scale down the "hZone" values so that smaller (shorter) flames appear more orange in color (warmer) and larger (higher) flames are more bluish in color (colder). In this case, if the fuel value is low (e.g., 50), the "warmScale" causes the flame to have no white color added to any row, thus making the flame appear more orange in color (warmer); if the fuel value is high (e.g., 250), the "warmScale" does nothing, thus making the flame larger (higher) and appear more bluish in color (colder).

Referring still to FIG. 4, a process of simulating a flame which takes into account wind forces that happen upon the flame. At time TO', an actuation value A0' is determined for the LEDs in row 0'. The actuation value A0' comprises values representing the brightness of each part of the red, green, blue, and white portions of each LED in the row 0' LEDs, and may be calculated as the "setRows" by the following code:

```
bri=fuel[0];
dim=lim(bri−25);
r=0;
g=dim*0.2;
b=dim*0.2;
w=0; and
setRows(r,g,b,w,0,200).
```

The “bri” variable is simply the initial fuel value of row 0'. The “0” in the parentheses of the “setRows” function represents the row number, and the “200” in the parentheses of the “setRows” function represents a wind circle for row 0'. In embodiments, wind circle values are pre-determined for row 0' and row 1', and are calculated for rows 2'-10'. In this case, a small value means a wind circle with a small radius of a given row, and a large value means a wind circle with a large radius of a given row. How different radii of wind circles affect the lighting of LEDs of different rows is further discussed in more detail below with reference to FIGS. 8A-8B. In this case, substantially at time TO', the actuation value A0' actuates the row 0' LEDs and generally corresponds to desired characteristics (such as intensity, color, color temperature, size, diameter, pausing, and flickering) of the output light of row 0' LEDs.

Row 1' is upwardly adjacent row 0'. At time T1' (e.g., 25 milliseconds after time T0'), an actuation value B0' is determined for the row 1' LEDs. The actuation value B0' comprises values representing the brightness of each part of the red, green, blue, and white portions of the row 1' LEDs, and may be calculated as the “setRows” by the following code:

```
bri=fuel[1];
setHzone(bri, 46);
dim=lim(bri−46)*1.2;
r=dim;
g=r*0.5;
b=dim*0.08;
if(dim>0) {w=warmScale*15}; and
setRows(r,g,b,w,1,150).
```

The actuation value B0' actuates the row 1' LEDs and generally corresponds to desired characteristics (such as intensity, color, color temperature, size, diameter, pausing, and flickering) of the output light of row 1' LEDs. Substantially simultaneously at Time T1', the row 0' LEDs are actuated by an actuation value A1' determined by a second fuel value.

Row 2' is upwardly adjacent row 1'. At time T2' (e.g., 25 milliseconds after time T1'), an actuation value C0' is determined for the row 2' LEDs. The actuation value C0' comprises values representing the brightness of each part of the red, green, blue, and white portions of the row 2' LEDs, and may be calculated as the “setRows” by the following code:

```
bri=fuel[2];
setHzone(bri, 67);
dim=lim(bri−67)*1.35;
r=dim*1.5;
g=r*0.19;
b=0;
if(dim>0) {w=warmScale*120}; and
setRows(r,g,b,w,2,hZone*250).
```

The actuation value C0' actuates the row 2' LEDs and generally corresponds to desired characteristics (such as intensity, color, color temperature, size, diameter, pausing, and flickering) of the output light of row 2' LEDs. Substantially simultaneously at Time T2', the row 1' LEDs are actuated by an actuation value B1' determined based on the second fuel value, and the row 0' LEDs are actuated by an actuation value A2' determined based on a third fuel value.

Row 3' is upwardly adjacent row 2'. At time T3' (e.g., 25 milliseconds after time T2'), an actuation value DO' is determined for the row 3' LEDs. The actuation value DO' comprises values representing the brightness of each part of the red, green, blue, and white portions of the row 3' LEDs, and may be calculated as the “setRows” by the following code:

```
bri=fuel[3];
setHzone(bri, 88);
dim=lim(bri−88)*1.5;
r=dim*1.5;
g=r*0.19;
b=0;
if(dim>0) {w=warmScale*140}; and
setRows(r,g,b,w,3,hZone*250).
```

The actuation value DO' actuates the row 3' LEDs and generally corresponds to desired characteristics (such as intensity, color, color temperature, size, diameter, pausing, and flickering) of the output light of row 3' LEDs. Substantially simultaneously at time T3', the row 2' LEDs are actuated by an actuation value C1' determined based on the second fuel value, the row 1' LEDs are actuated by an actuation value A2' determined based on the third fuel value, and the row 0' LEDs are actuated by an actuation value A3' determined based on a fourth fuel value.

Row 4' is upwardly adjacent row 3'. At time T4' (e.g., 25 milliseconds after time T3'), an actuation value is determined for the row 4' LEDs. The actuation value E0' comprises values representing the brightness of each part of the red, green, blue, and white portions of the row 4' LEDs, and may be calculated as the “setRows” by the following code:

```
bri=fuel[4];
setHzone(bri, 109);
dim=lim(bri−109)*1.7;
r=dim*1.5;
g=r*0.19;
b=0;
if(dim>0){w=warmScale*165}; and
setRows(r,g,b,w,4,hZone*250).
```

The actuation value E0' actuates the row 4' LEDs and generally corresponds to desired characteristics (such as intensity, color, color temperature, size, diameter, pausing, and flickering) of the output light of row 4' LEDs.

Substantially simultaneously at time T4', the row 3' LEDs are actuated by an actuation value D1' determined based on the second fuel value, the row 2' LEDs are actuated by an actuation value C2' determined based on the third fuel value, the row 1' LEDs are actuated by an actuation value B3' determined based on the fourth fuel value, and the row 0' LEDs are actuated by an actuation value A4' determined based on a fifth fuel value.

Row 5' is upwardly adjacent row 4'. At time T5' (e.g., 25 milliseconds after time T4'), an actuation value F0' is determined for the row 5' LEDs. The actuation value F0' comprises values representing the brightness of each part of the red, green, blue, and white portions of the row 5' LEDs, and may be calculated as the “setRows” by the following code:

```
bri=fuel[5];
setHzone(bri, 130);
dim=lim(bri−130)*2;
r=dim;
g=r*0.19;
b=0;
if(dim>0){w=warmScale*190}; and
setRows(r,g,b,w,5,hZone*250).
```

The actuation value F0' actuates the row 5' LEDs and generally corresponds to desired characteristics (such as intensity, color, color temperature, size, diameter, pausing, and flickering) of the output light of row 5' LEDs.

Similarly as described above, substantially simultaneously at time T5', the row 4' LEDs are actuated by an actuation value E1' determined based on the second fuel value, the row 3' LEDs are actuated by an actuation value D2' determined based on the third fuel value, the row 2' LEDs are actuated by an actuation value C3' determined based on the fourth fuel value, the row 1' LEDs are actuated by an actuation value B4' determined based on the fifth fuel value, and the row 0' LEDs are actuated by an actuation value A5' determined based on a sixth fuel value.

Row 6' is upwardly adjacent row 5'. At time T6' (e.g., 25 milliseconds after time T5'), an actuation value G0' is determined for the row 6' LEDs. The actuation value G0' comprises values representing the brightness of each part of the red, green, blue, and white portions of the row 6' LEDs, and may be calculated as the "setRows" by the following code:

```
bri=fuel[6];
setHzone(bri, 151);
dim=lim(bri−151)*2.4;
r=dim;
g=r*0.19;
b=0;
if(dim>0){w=warmScale*200}; and
setRows(r,g,b,w,6,hZone*250).
```

The actuation value G0' actuates the row 6' LEDs and generally corresponds to desired characteristics (such as intensity, color, color temperature, size, diameter, pausing, and flickering) of the output light of row 6' LEDs.

Similarly as described above, substantially simultaneously at time T6', the row 5' LEDs are actuated by an actuation value F1' determined based on the second fuel value, the row 4' LEDs are actuated by an actuation value E2' determined based on the third fuel value, the row 3' LEDs are actuated by an actuation value D3' determined based on the fourth fuel value, the row 2' LEDs are actuated by an actuation value C4' determined based on the fifth fuel value, the row 1' LEDs are actuated by an actuation value B5' determined based on the sixth fuel value, and the row 0' LEDs are actuated by an actuation value A6' determined based on a seventh fuel value.

Row 7' is upwardly adjacent row 6'. At time T7' (e.g., 25 milliseconds after time T6'), an actuation value H0' is determined for the row 7' LEDs. The actuation value H0' comprises values representing the brightness of each part of the red, green, blue, and white portions of the row 7' LEDs, and may be calculated as the "setRows" by the following code:

```
bri=fuel[7];
setHzone(bri, 172);
dim=lim(bri−172)*3.04;
r=dim;
g=r*0.19;
b=0;
if(dim>0) {w=warmScale*190}; and
setRows(r,g,b,w,7,hZone*250).
```

The actuation value H0' actuates the row 7' LEDs and generally corresponds to desired characteristics (such as intensity, color, color temperature, size, diameter, pausing, and flickering) of the output light of row 7' LEDs.

Substantially simultaneously at Time T7', the row 6' LEDs are actuated by an actuation value G1' determined based on the second fuel value, the row 5' LEDs are actuated by an actuation value F2' determined based on the third fuel value, the row 4' LEDs are actuated by an actuation value E3' determined based on the fourth fuel value, the row 3' LEDs are actuated by an actuation value D4' determined based on the fifth fuel value, the row 2' LEDs are actuated by an actuation value C5' determined based on the sixth fuel value, the row 1' LEDs are actuated by an actuation value B6' determined based on the seventh fuel value, and the row 0' LEDs are actuated by an actuation value A7' determined based on an eighth fuel value.

Row 8' is upwardly adjacent row 7'. At time T8' (e.g., 25 milliseconds after time T7'), an actuation value TO' is determined for the row 8' LEDs. The actuation value TO' comprises values representing the brightness of each part of the red, green, blue, and white portions of the row 8' LEDs, and may be calculated as the "setRows" by the following code:

```
bri=fuel[8];
setHzone(bri, 193);
dim=lim(bri−193)*4.06;
r=dim;
g=r*0.19;
b=0;
if(dim>0){w=warmScale*180}; and
setRows(r,g,b,w,8,hZone*225).
```

The actuation value TO' actuates the row 8' LEDs and generally corresponds to desired characteristics (such as intensity, color, color temperature, size, diameter, pausing, and flickering) of the output light of row 8' LEDs.

Substantially simultaneously at Time T8', the row 7' LEDs are actuated by an actuation value H1' determined based on the second fuel value, the row 6' LEDs are actuated by an actuation value G2' determined based on the third fuel value, the row 5' LEDs are actuated by an actuation value F3' determined based on the fourth fuel value, the row 4' LEDs are actuated by an actuation value E4' determined based on the fifth fuel value, the row 3' LEDs are actuated by an actuation value D5' determined based on the sixth fuel value, the row 2' LEDs are actuated by an actuation value C6' determined based on the seventh fuel value, the row 1' LEDs are actuated by an actuation value B7' determined based on the eighth fuel value, and the row 0' LEDs are actuated by an actuation value A8' determined based on an ninth fuel value.

Row 9' is upwardly adjacent row 8'. At time T9' (e.g., 25 milliseconds after time T8'), an actuation value J0' is determined for the LEDs in row 3'. The actuation value J0' comprises values representing the brightness of each part of the red, green, blue, and white portions of the row 9' LEDs, and may be calculated as the "setRows" by the following code:

```
bri=fuel[9];
setHzone(bri, 214);
dim=lim(bri−214)*6.19;
r=dim;
g=r*0.19;
b=0;
if(dim>0){w=warmScale*180}; and
setRows(r,g,b,w,9,hZone*200).
```

The actuation value J0' actuates the row 9' LEDs and generally corresponds to desired characteristics (such as intensity, color, color temperature, size, diameter, pausing, and flickering) of the output light of row 9' LEDs.

Substantially simultaneously, the row 8' LEDs are actuated by an actuation value I1' determined based on the second fuel value, the row 7' LEDs are actuated by an actuation value H2' determined based on the third fuel value, the row 6' LEDs are actuated by an actuation value G3' determined based on the fourth fuel value, the row 5' LEDs are actuated by an actuation value F4' determined based on the fifth fuel value, the row 4' LEDs are actuated by an actuation value E5' determined based on the sixth fuel value, the row 3' LEDs are actuated by an actuation value D6' determined based on the seventh fuel value, the row 2' LEDs are actuated by an actuation value C7' determined based on the eighth fuel value, the row 1' LEDs are actuated by an actuation value B8' determined based on the ninth fuel value, and the row 0' LEDs are actuated by an actuation value A9' determined based on an tenth fuel value.

Row 10' is upwardly adjacent row 9'. At time T10' (e.g., 25 milliseconds after time T9'), an actuation value K0' is determined for the LEDs in row 3'. The actuation value K0' comprises values representing the brightness of each part of the red, green, blue, and white portions of the row 10' LEDs, and may be calculated as the "setRows" by the following code:

```
bri=fuel[10];
setHzone(bri, 235);
dim=lim(bri−235)*12.19;
r=dim;
g=r*0.19;
b=0;
if(dim>0){w=warmScale*130}; and
setRows(r,g,b,w,10,hZone*250).
```

The actuation value K0' actuates the row 10' LEDs and generally corresponds to desired characteristics (such as intensity, color, color temperature, size, diameter, pausing, and flickering) of the output light of row 10' LEDs.

Substantially simultaneously, the row 9' LEDs are actuated by an actuation value J1' determined based on the second fuel value, the row 8' LEDs are actuated by an actuation value I2' determined based on the third fuel value, the row 7' LEDs are actuated by an actuation value H3' determined based on the fourth fuel value, the row 6' LEDs are actuated by an actuation value G4' determined based on the fifth fuel value, the row 5' LEDs are actuated by an actuation value F5' determined based on the sixth fuel value, the row 4' LEDs are actuated by an actuation value E6' determined based on the seventh fuel value, the row 3' LEDs are actuated by an actuation value D7' determined based on the eighth fuel value, the row 2' LEDs are actuated by an actuation value C8' determined based on the ninth fuel value, the row 1' LEDs are actuated by an actuation value B9' determined based on the tenth fuel value, and the row 0' LEDs are actuated by an actuation value A10' determined based on an eleventh fuel value.

It shall be understood that the processes described herein may be iterative for so long a time as energy is supplied to the lighting device 100. It is to be further understood that TO', T1', T2', etc. may be consecutive time intervals. Although 25 milliseconds are used in the above example as the time interval, such a consecutive time interval may be any length of time period longer than 1 nanosecond. Furthermore, the time intervals may, but need not be equal. For example, TO' may be 25 milliseconds, T1' may be 30 milliseconds, etc. Or, TO' may be 25 milliseconds, and T1' may be 10 milliseconds.

While 11 rows of LEDs are illustrated in the example provided herein, the invention is not necessarily limited to 11 rows of LEDs and such a lighting device may comprise other numbers of rows of LEDs, individually or in combination, in achieving similar functions.

In addition to the flickering effects, the simulated flame may additionally be configured to simulate the bending of the flame in the wind so as to more realistically simulate a fire. In order to do so, a two dimensional coordinate (X, Y) representing a discrete wind point in a given row is introduced to the aforementioned simulation, and is described in further detail below.

Figure 5:
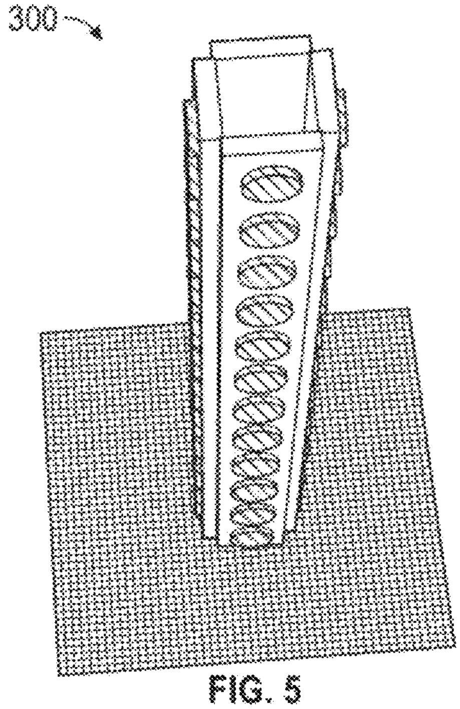
FIG. 5 is an LED strip positioned in a two-dimensional horizontal plane.

FIG. 5 shows an exemplary embodiment of an LED strip 300 in a two dimensional plane. Similar to a fuel value being passed up each row every cycle, the X and Y values of the wind point are also passed up each row every cycle. Additionally, at each new row, a new discrete wind point (e.g., X and Y coordinates) is assigned to the row, which may be randomly generated (e.g., optionally generated by a random number generator). The X and Y values passed up from the previous row are added to or subtracted from (depending on the values for X and Y) the X and Y values of the new discrete wind point. For example, in an embodiment, the row 1 LEDs may have a wind point with X=0 and Y=0. The row 2 LEDs may be assigned a wind point having coordinates of X=1 and Y=2. And the row 3 LEDs are assigned a wind point having coordinates of X=2 and Y=−1. Since the X and Y values from row 2 are passed to row 3, the resultant X and Y coordinates from row 3 are X=3 and Y=1. These X and Y values are then passed to row 4, and added to (or subtracted from, as the case may be) the X and Y values for the discrete wind point assigned to row 4. Accordingly, the top row LEDs will necessarily have the most movement due to the effect of the simulated wind because the values of the X and Y coordinates are summed as the process proceeds upwards along the vertically aligned rows of LEDs.

The location of the wind point is directly related to the intensity of the illumination of the LEDs in a particular row of LEDs. The intensity may be output as brightness, or as color (e.g., more white light than warm light). As is illustrated below, a wind point that is equidistant from all LEDs in a particular row will result in equal, or substantially equal, intensity from each LED in the row. But, as a wind point is moved closer to, and therefore farther away from, certain LEDs, the LEDs that are in closest proximity to the wind point will exhibit a higher intensity than those LEDs which are farther from the wind point.

Figure 6A:
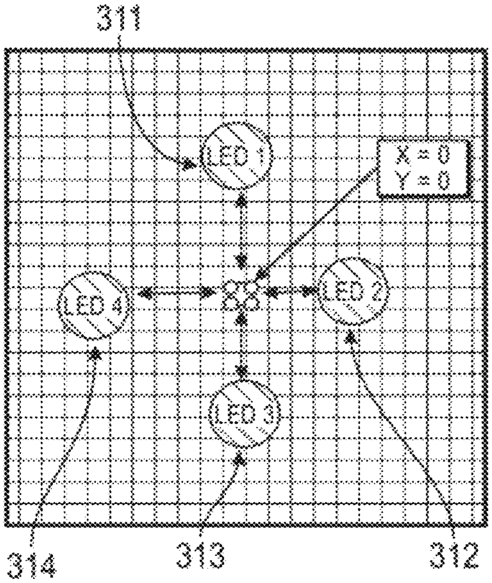
FIG. 6A is an exemplary control illustration of a lighting devices comprising 4 LED strips, indicating the simulated wind effects of the first formed row of LEDs.
Figure 6B:
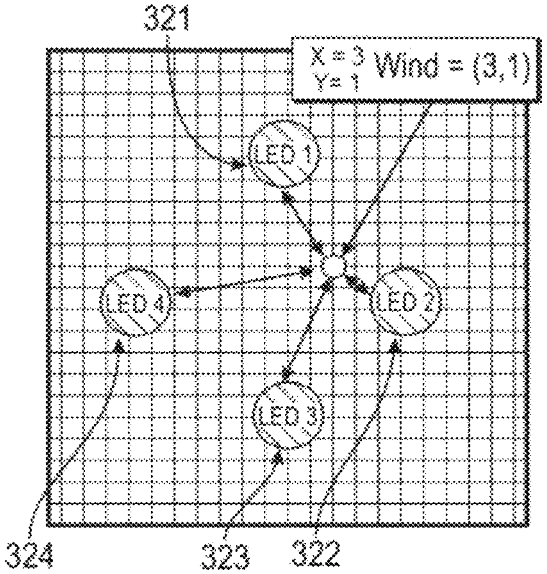
FIG. 6B is an exemplary control illustration of a lighting devices comprising 4 LED strips, indicating the simulated wind effects of the second and above formed rows of LEDs.

FIGS. 6A-6B illustrate an exemplary control of 4 LEDs substantially aligned in a two dimensional horizontal plane or a "row". The two dimensional coordinate (X, Y) represents the relative location of a wind point, indicating the wind effect within the two dimensional plane. FIG. 6A shows the row 1 LEDs of the 4 LED columns, the wind point has a two dimensional coordinate X=0 and Y=0, and is equidistant to all of the LEDs (311-314) in the row, indicating there is virtually no wind effect for this row of LEDs, or no bending of the flame. In other words, each of LEDs 311, 312, 313, and 314 have equal, or substantially equal, intensity. Also, in this case, no number would be passed up to the subsequent row to be added or subtracted to the new wind value.

FIG. 6B shows another row of LEDs. In the example shown in FIG. 6B, the wind point has a two dimensional coordinate (3, 1), which places the wind point closest to LED 322, and furthest away from LED 324. In this case, the intensity of LED 322 is the greatest and the intensity of LED 324 is the least of the 4 LEDs shown. Similarly, the intensities of LEDs in other rows are selectively actuated in the same way, thus creating the effect of a flame bending in the wind.

It is to be understood that while only rows of LEDs on one two-dimensional horizontal plane are shown in FIG. 6B, rows of LEDs on other planes may have their own two dimensional coordinates indicating their own simulated bending effects of wind which may be the same as or different from the bending effects of wind shown in FIG. 6B.

Figure 7A:
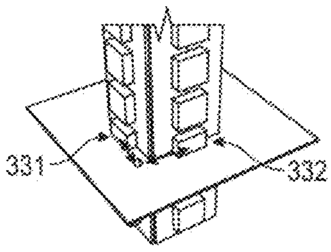
FIG. 7A is an illustration of a wind point moving up in row 3.
Figure 7B:
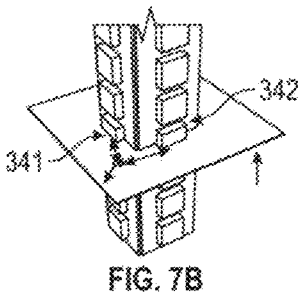
FIG. 7B is an illustration of a wind point moving up in row 4.
Figure 7C:
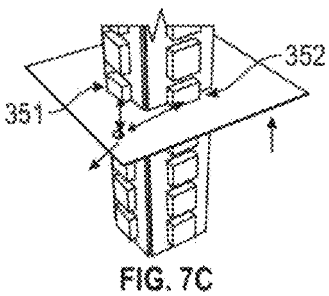
FIG. 7C is an illustration of a wind point moving up in row 5.

FIGS. 7A-7C illustrate an example of how a wind point is passed from row 3 to row 5 along a horizontal axis, and how such a move affects the LEDs on each row along the way. As described, in embodiments, at every consecutive time interval, fuel values are passed up from the row below. The wind point (X, Y), represented as (windX, windY) in the simulation, are moved up similarly. In addition, at every consecutive time interval, all windX and windY values change by adding to or subtracting from random numbers (or semi-random numbers) to simulate the wind effect. As the figures progress from FIG. 7A to FIG. 7C, the wind point moves away from the column of LEDs. During this simulation process, LED 331 is brighter than LED 341, which itself is brighter than LED 351 due to the movement of the location of the wind point as the process moves up the column. Similarly, LED 332 is brighter than LED 342, which itself is brighter than LED 352 due to the movement of the location of the wind point as the process moves up the column.

More specifically, in an embodiment, the iteration of the windX and windY values proceeds as described below. At every consecutive time interval, coordinate values (windX, windY) are calculated for the wind point as the "windMove" function by the following code:

```
void windMove(int windDirX, int windDirY){
  for(int i=0;i<numRows;i++){
    windX[i] += windDirX;
    windY[i] += windDirY;
  }}.
```

Here, the windX[i] and windY[i] values are iterated during the calculation of the row i. In this embodiment, windX[i] and windY[i] in the row 0' have initial values of windX[0]=0 and windY[0]=0. During the iteration of the row i, random or semi-random numbers are added to or subtracted from the wind point values (windX[i−1], windY [i−1]) received by the row i from the row i−1 to generate the wind points values of the row i (windX[i], windy[i]). In other words, the iteration of the wind point values of the row i (windX[i], windY[i]) is based on the previous wind point values of the row i−1 (windX[i−1],windY[i−1]), and such dependency of wind point values passes on from row i all the way to row 0', whose initial wind point values are (0, 0).

Further, distances between the wind points and each of the LEDs in the given row are calculated as the "dist" function by the following code:

```
double dist(double x1,double y1, double x2, double y2){
  int distance = sqrt((x1−x2)*(x1−x2)+(y1−y2)*(y1−y2));
  return distance;
}.
```

Here, "double x1" and "double y1" are the coordinate values of a local LED, while "double x2" and "double y2" are the coordinate values of the wind point in the two-dimensional horizontal plane in which the local LED is located.

Similar to what is mentioned earlier, in this embodiment, the wind point coordinate is iterated in each calculation of the given row. For example, the row 0' will always have a (0, 0) wind point. And the wind point at row 3' (windX(3), windY(3)) will be iterated three times from the original (windX(0), windY(0)) wind point. Similarly, the wind point at row 5' (windX(5), windy(5)) will be iterated five times from the original (windX(0), windY(0)) wind point.

Given the above wind simulations, LEDs are actuated by actuation values calculated as the "setRows" function by the following code:

```
void setRows(int r, int g, int b, int w, int row, int rad){
  for(int i=0;i<numSect;i++){
    int far = dist(ledLocal[i][0],
ledLocal[i][1],windX[row],windY[row]);
    double cooler = 1 − double(far)/double(rad);
    pixels.setPixelColor(rows[row][i], pixels.Color(lim(r * cooler),
lim(g * cooler), lim( b * cooler), lim(w * cooler)));
  }
}.
```

In addition to the aforementioned calculation of Red/Green/Blue/White values, wind point movement, and distances between wind point and LEDs, "cooler" is a variable that dims the LED as the distance between the LED and the wind point is increased. The local "rad" variable is the previous "hZone" value that was passed in. As briefly noted above, a small "rad" value means a wind circle with a small radius of a given row, and a large "rad" value means a wind circle with a large radius of a given row. This is further illustrated in the FIGS. 8A-8B.

Figure 8A:
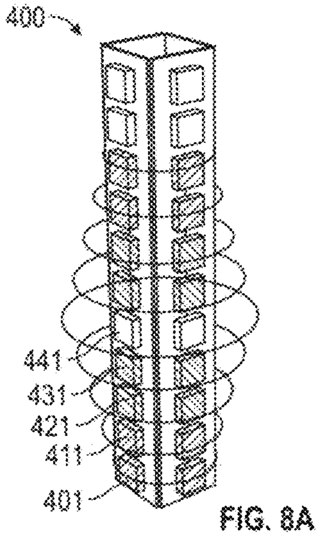
FIG. 8A is an illustration of a simulated flame without wind effect.
Figure 8B:
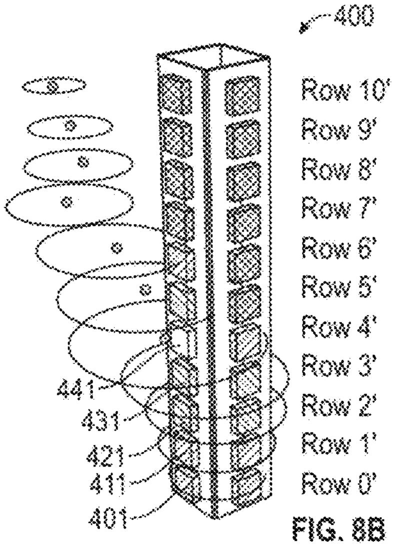
FIG. 8B is an illustration of a simulated flame with a typical wind gust.

FIG. 8A shows a simulated flame with no wind effect. In this case, the wind points of all rows remain in the central (0, 0) position like a straight spine. The black lines are wind circles determined based on the coordinates of wind points. LEDs in each row are all in equal distances to wind points on each two-dimensional horizontal plane, thus all have the same intensity (e.g., brightness) based on the wind effect. However, the LEDs in the mid rows are brighter and whiter than the LEDs on the top or bottom rows because LEDs in the mid rows are closer to the midpoint of the flame. FIG. 8B shows a simulated bending of a flame in a typical wind gust. The wind point in row 0' remains at a central (0, 0) point, while other wind points upwardly positioned are shifted from the central axis. In the embodiment illustrated in FIG. 8B, LED 441 is the brightest because it is both closest to the wind point of its row, and nearest the midpoint of the flame. The LEDs in row 6' and below rows are either partially or fully within the calculated wind circles of their rows, and thus are either partially or fully actuated. The LEDs above row 6' are so far away from the wind points that they are out of the calculated wind circles of their rows. In such a case, the LEDs above row 6' are not actuated at all. The bending of a flame caused by a wind gust is thus simulated by shifting wind point positions row by row, brightening the LEDs closer to the wind points, dimming the LEDs further away from wind points, and shutting off LEDs out of the wind circles of the wind points.

The above illustrations demonstrate a simulation of a flame by actuating LEDs based on a fuel value, the distance to the midpoint, and the wind effect. However, in alternative embodiments, the simulation of a flame by actuating LEDs may be based only on fuel values, distance to the midpoint, or wind effect, or any combination of these factors.

Further, the fuel value, the wind point value, the distance value, or any other initial values may be generated by a random number generator, a semi-random number generator, or a manual entry. Alternately, such values may be generated by a pseudorandom number generator, a deterministic random bit generator, a hardware random number generator, a cryptographic algorithm, an algorithmic pattern (sine wave or cosine wave) number generator, a periodic pattern number generator, or any other deterministic random number generation algorithms or deterministic number generation algorithms.

Additionally, a sensor or multiple sensors (e.g., wind sensors) may be used individually or in combination to measure and determine initial values. For example, wind sensors may measure the wind in the environment, and generate wind point values based on the measurements. The sensors may be configured to pull weather data (including but not limited to wind data) at different times and locations from weather broadcasts, and generate the wind point values based on the weather data.

In some embodiments, the disclosure further provides flame simulation methods and systems using LEDs and a microcontroller based on a spark simulation and/or a perpetual middle simulation. The microcontroller runs a program to control the LEDs, and the program utilizes object-oriented programing. A simulation is created which represents rising sparks within a flame and a center of the flame whose properties adjust to sparks traveling through and above it. The LEDs may be aligned vertically in a single row, or include groups in which some groupings are adjacently above or below others. They can be ordered in countless orientations as long as some LEDs are higher or lower than others.

Figure 9:
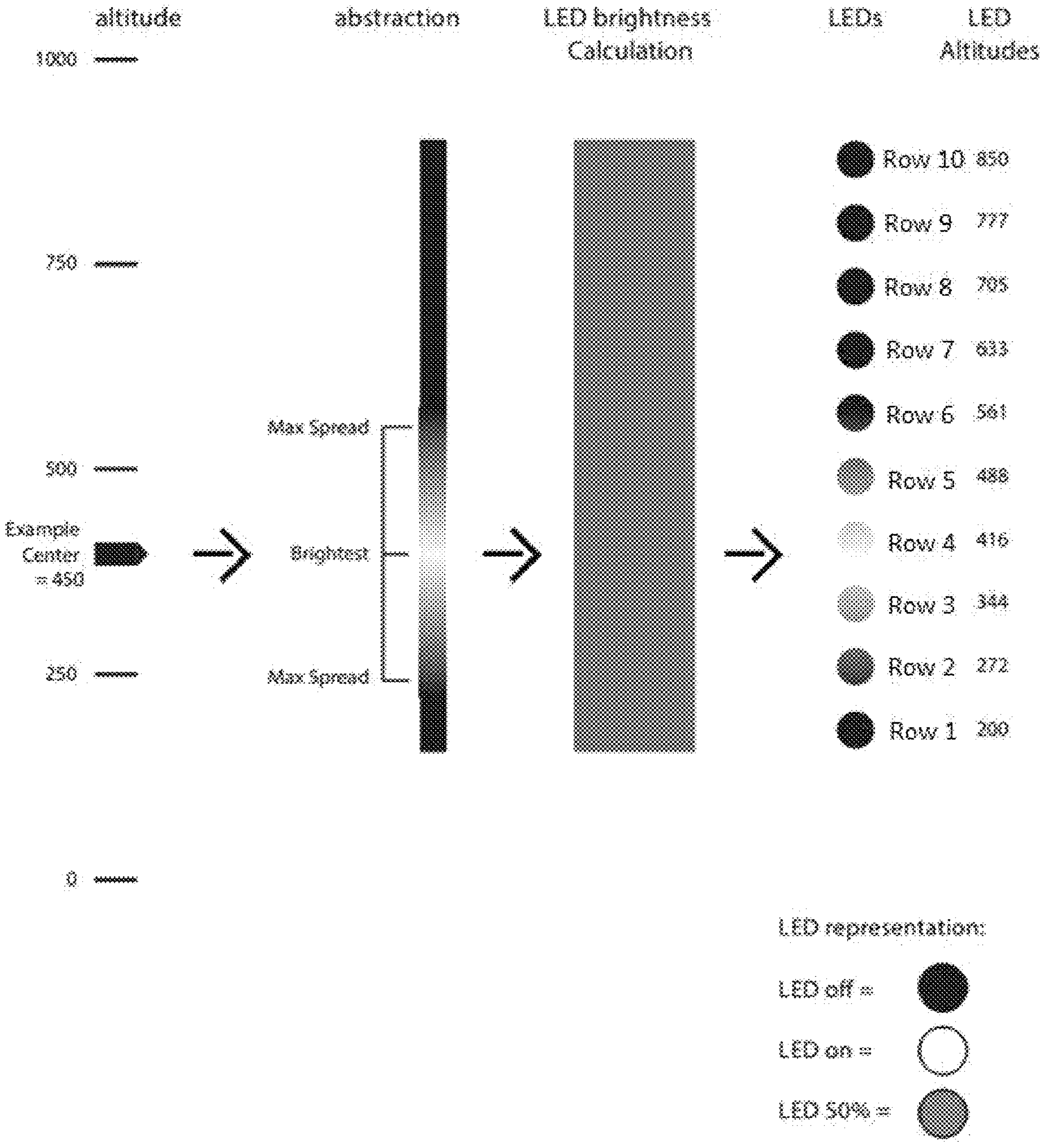
FIG. 9 is an example of a spark simulation.
Figure 10:
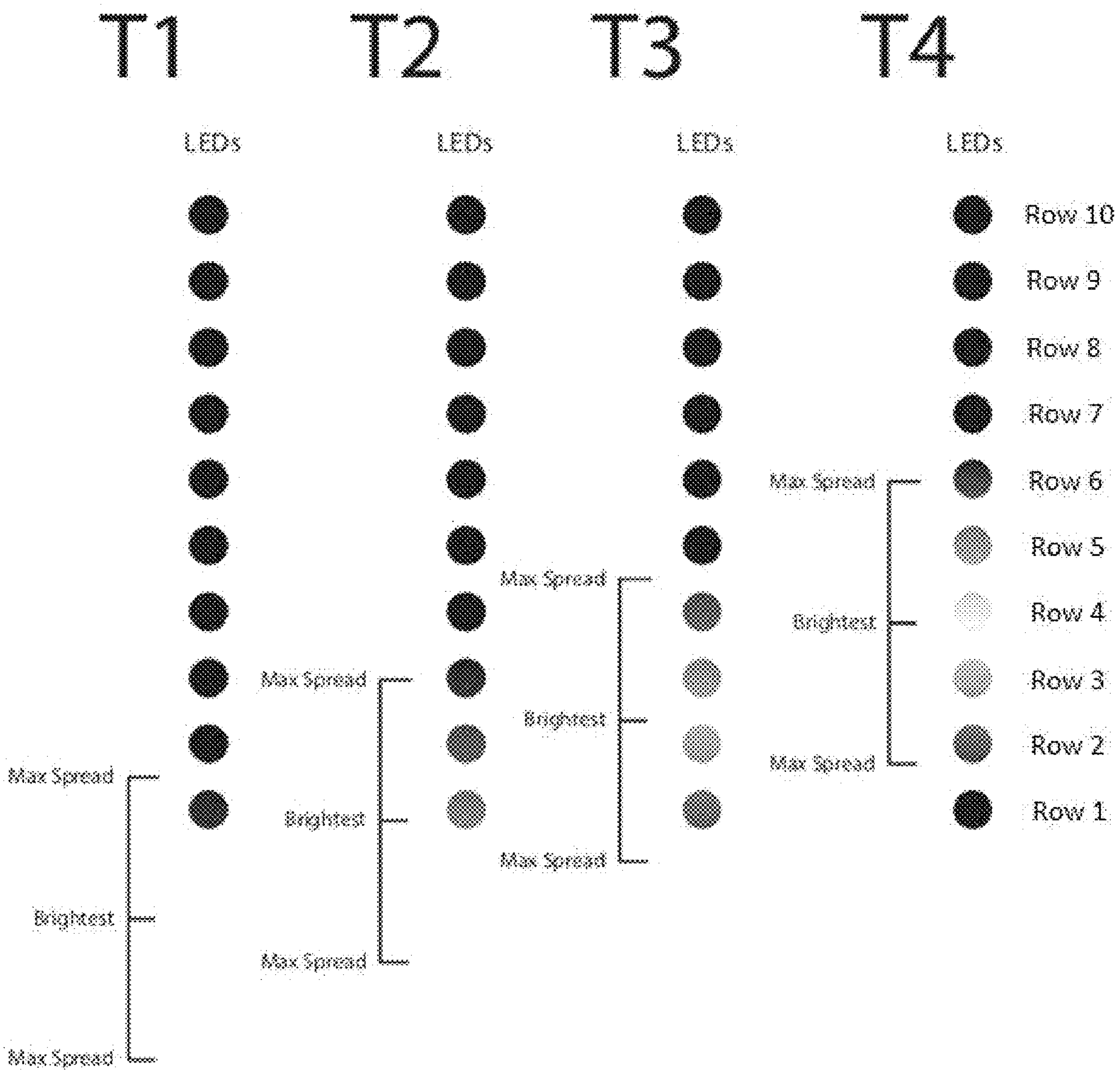
FIG. 10 is an example of a rising spark simulation.
Figure 11:
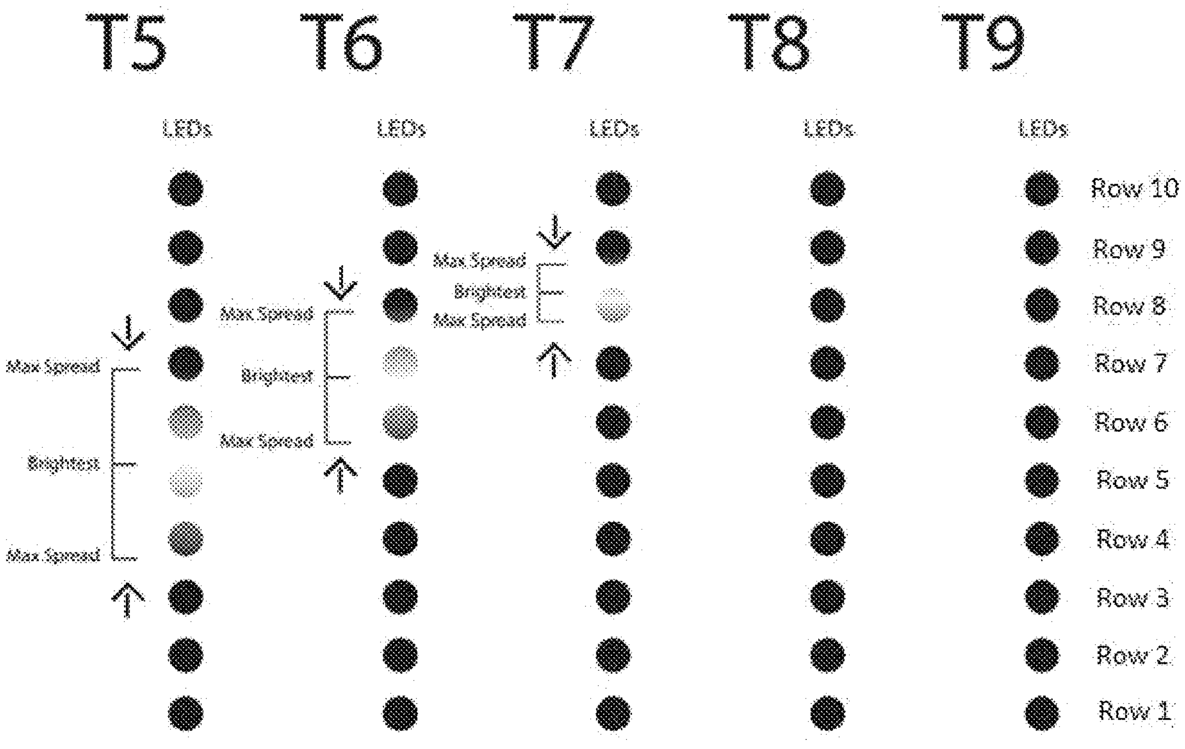
FIG. 11 is an example of contracting spark simulation.

FIGS. 9-11 show a non-limiting exemplary embodiment of a spark simulation at different times within a simulation period. The spark simulation utilizes ten LED rows numbered from row 1 to row 10, with the bottom LED unit or group being row 1 and the top LED unit or group being row 10.

FIG. 9 shows an example of a spark simulation. In the simulation, an altitude is defined from 0 to 1000, with 0 being lowest and 1000 being highest. 10 rows of LEDs are aligned vertically on top of each other. As shown in FIG. 9, row 1 is positioned at 200 altitude, row 2 is positioned at 272 altitude, row 3 is positioned at 344 altitude, row 4 is positioned at 416 altitude, row 5 is positioned at 488 altitude, row 6 is positioned at 561 altitude, row 7 is positioned at 633 altitude, row 8 is positioned at 705 altitude, row 9 is positioned at 777 altitude, and row 10 is positioned at 850 altitude. It is to be understood that while FIG. 9 shows a spark simulation with a non-limiting height arrangement of 10 rows of LEDs, the LED units or groups may be arranged in different numbers, positions, altitudes, directions, and/or relative distances between each other. It is to be further understood that while the LED units or groups in FIG. 9 are arranged vertically on top of each other, they may be, individually or in combination, arranged horizontally, diagonally, or in other angled directions, next to each other. According to the embodiment shown in FIG. 9, a spark is represented in a simulation software and includes an integer variable called “center”. The spark center’s range (0 to 1000 altitude in exemplary embodiments) is the spark’s altitude range, and the spark center’s value is the spark’s altitude. For example, a spark center with a value of 100 altitude is low in altitude while a spark center with a value of 900 altitude is high in altitude. The center of a spark is its brightest area. Areas further away from the spark center are less bright. Areas outside a max spread of the spark is completely dark. The center of the simulated spark in FIG. 9 is at 450 altitude. The closer a given LED row is to the spark center 450 altitude, the brighter it is; the further the LED row is from the spark center 450 altitude, the dimmer it is. For example, row 4 LED at 416 altitude is the brightest, row 3 LED at 344 altitude is next in brightness, row 5 LED at 488 altitude is next, row 2 LED at 272 altitude is next, and row 6 LED at 561 altitude is the least in brightness. Rows 7-10 LEDs and row 1 LED are outside the max spread of the simulated spark. Thus, they are completely off. Different brightness levels of an LED row are represented by different shades of grey in the figure, with white being 100% on and black being 0% on (100% off). Specifically, the LED brightness may be determined by the following codes.

LED Brightness Function $$d = \text{ledAltidude} - \text{center}; \text{ and}$$

$$\text{ledTemp} = \text{temp} * (\text{spread} - d / \text{spread}).$$

As shown in the codes above, d is the distance from the center of the spark to the LED altitude. ledAlstidude is the altitude of the LED, center is the altitude of the spark center, ledTemp is a brightness value for controlling LED electricity to achieve varying brightness, temp is the brightness of the LED if the LED altitude is exactly the same as the spark center attitude, and spread is the distance from the spark center in which the LEDs will no longer receive any brightness.

FIG. 10 shows an example of a first half (“rising” half) of a spark simulation period from time T1 to time T4. At time T1, the spark simulation period starts. The spark center is below the row 1 LED, and the upper end of the max spread passes row 1. Rows 2-10 LEDs are out of the max spread range and completely off. The brightness of the spark starts to increase from this time on. At time T2, the spark center moves upward near row 1, the upper end of the spark reaches row 3. The brightness of the spark keeps increasing as the spark center continues to move upward. At time T3, the spark center passes row 2, the upper end of the spark passes row 4. The brightness of the spark keeps increasing as the spark center continues to move upward, similar to T2. At time T4, the spark center moves near row 4, the upper end of spark reaches row 6 and the lower end of the spark is between row 1 and row 2. The brightness of the spark reaches its peak value in the first half (“rising half”) of the simulation period. It is to be understood that while the spread remains relatively constant in the rising spark simulation from time T1 to time T4, its value may vary randomly or automatically according to pre-set programs or manual inputs. For example, the spread may increase from time T1 to time T4, and reaches its peak value at time T4. Or, the spread may increase from time T1 to time T2, and decrease from time T3 to time T4.

Moving on, FIG. 11 shows an example of a second half (“contracting” half) of a spark simulation period from time T5 to time T9 right after the first half of the spark simulation from time T1 to time T4 shown in FIG. 10. At time T5, the spark center reaches the middle of the spark simulation, and is positioned between row 5 and row 6. From this time on, the max spread of the spark starts to decrease. At time T6, the spark center is near row 7. The max spread of the spark keeps decreasing as the spark center continues to move upward. At time T7, the spark center passes row 8, and the spread keeps decreasing as the spark center continues to move upward. At time T8, the simulated spark terminates and the spread shrinks to zero. There is no brightness at all for all 10 rows of LEDs. T9 is similar to T8: no spark, no spread, and no brightness. In some embodiments of a single spark simulation, at time T9, the values of the spread of a single spark, its brightness, and the rate at which its center increases all change until they are similar to what they were at time T1, which signals the end of current spark simulation period and also the start of the next spark simulation period. In other embodiments of multiple sparks simulations, at time T9, those values may change to other numbers, integers, or percentages different from what they were at time T1.

It is to be understood that while the brightness of the simulated spark remains relatively constant in the contracting spark simulation from time T5 to time T7, its value may vary randomly or automatically according to pre-set programs or manual inputs. For example, the brightness may decrease from time T5 to time T7. Or, it may increase from time T5 to time 6, and decrease from time T7 to time T9.

Figure 12:
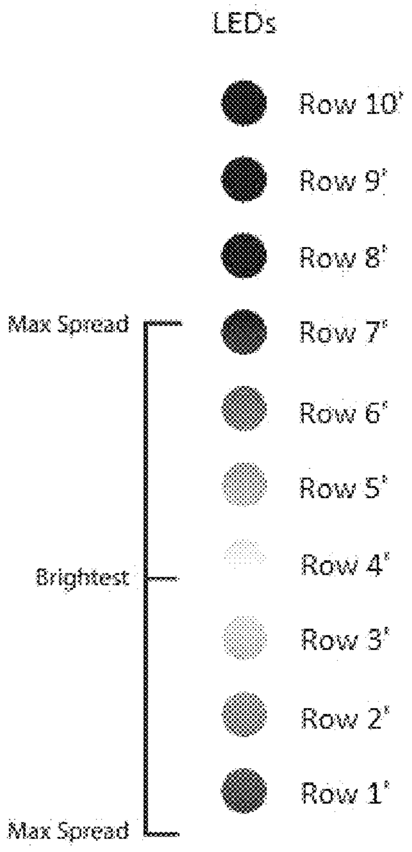
FIG. 12 is an example of a perpetual middle simulation.

FIG. 12 shows an example of a perpetual middle simulation. Similar to the spark simulation in FIG. 9, the perpetual middle simulation in FIG. 12 also has 10 rows of LEDs aligned vertically on top of each other, with the perpetual middle center near row 4' being brightest. The closer a given LED row is to the perpetual middle center, the brighter it is; the further the LED row is from the perpetual middle center, the dimmer it is. For example, in FIG. 12, row 4' LED is the brightest, row 3' LED is next in brightness, row 5' LED is next, and so on. Row 7' is the least in brightness. Rows 8'-10' LEDs are outside the max spread of the simulated perpetual middle. Thus, they are completely off.

In some embodiments, the perpetual middle simulation does not rise or terminate like the spark simulation. In other embodiments, the perpetual middle simulation rises or terminates like the spark simulation.

The perpetual middle simulation may use the same LED brightness function as that of the spark simulation to calculate the brightness it provides to each LED unit or group. Optionally, the perpetual middle simulation may use an LED brightness function different from that of the spark simulation to calculate the brightness.

It is to be understood that while FIG. 12 shows a perpetual middle simulation with a non-limiting height arrangement of 10 rows of LEDs numbered from row 1' through row 10', with the bottom group being row 1' and the top group being row 10', the LED units or groups may be arranged in different numbers, positions, altitudes, directions, and/or relative distances between each other. It is to be further understood that while the LED units or groups in FIG. 12 are arranged vertically on top of each other, they may be, individually or in combination, arranged horizontally, diagonally, or in other angled directions, next to each other.

FIGS. 13-21 show a non-limiting exemplary embodiment of a flame simulation based on a combination a perpetual middle simulation and a spark simulation within a simulation period from time T1 to time T9. FIGS. 13-16 shows the first half ("rising" half) of the flame simulation period from time T1 to time T4 based on the combination of a perpetual middle simulation and a rising flame simulation. FIGS. 17-21 shows the second half ("contracting" half) of the flame simulation period from time T5 to time T9 based on the combination of a perpetual middle simulation and a contracting flame simulation.

Figure 13:
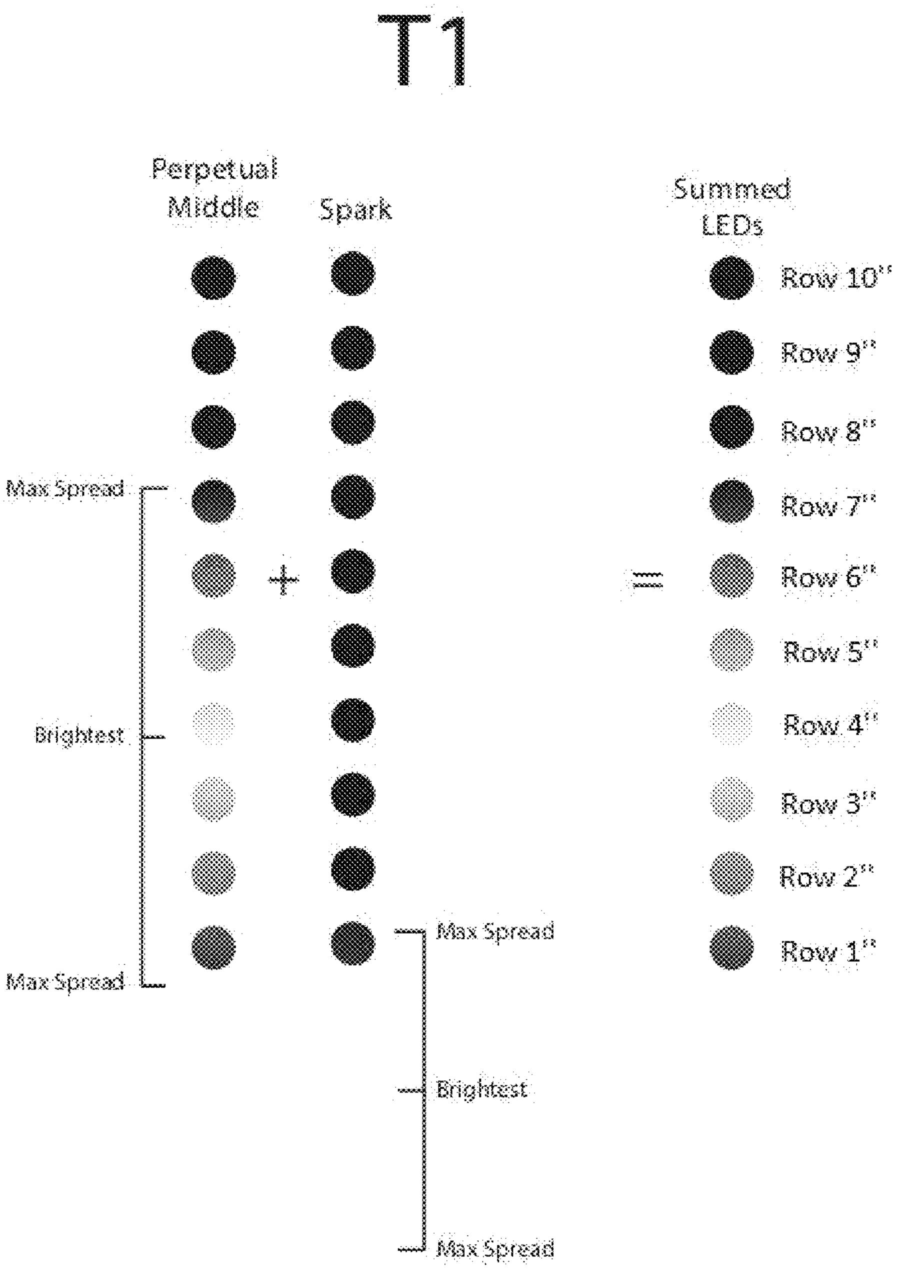
FIG. 13 is an example of a flame simulation combining a perpetual middle simulation and a rising spark simulation at time T1.

As shown in FIGS. 13-21, the flame simulation utilizes ten rows of LEDs numbered from row 1" to row 10" with the bottom unit or group being row 1" and the top unit or group being row 10". The LED units or groups may be arranged in different numbers, positions, altitudes, directions, and/or relative distances between each other. It is to be understood that while the LED units or groups in FIG. 13 are arranged vertically on top of each other, they may be, individually or in combination, arranged horizontally, diagonally, or in other angled directions, next to each other. The flame simulation in FIGS. 13-21 may be the same as or different from the spark simulation or perpetual middle simulation shown in FIGS. 9-12. The spread of a single simulated flame/spark/perpetual middle, its brightness, and the rate at which its center increases in value can be set randomly or automatically according to pre-set programs or manual inputs. In some embodiments, creating multiple simulated sparks, perpetual middles, and/or flames with variance in one or more of these values may help to mimic the variance in actual flames.

In each of the ten rows, the brightness of the LEDs for simulating a flame is calculated by adding the brightness of the LEDs for simulating a perpetual middle and the brightness of the LEDs for simulating a spark. For example, row 1"=row 1'+row 1, row 2"=row 2'+row 2, so on and so forth. In some embodiments, this is achieved by adding the control integer of a perpetual middle simulation LED and the control integer of a spark simulation LED, and actuating a summed LED with the added control integer. The perpetual middle can be independent of the rising or contracting spark, or change over time in reaction to the rising or contracting spark. Optionally, the brightness of the LEDs for simulating a flame in one row can be calculated by adding the brightness of the LEDs for simulating a perpetual middle in a second row and the brightness of the LEDs for simulating a spark in a third row. The row numbers of a flame simulation LED row, a spark simulation LED row, or a perpetual middle LED row can be the same or different. For example, row 5"=row 6'+row 6, or row 2"=row 8'+row 3'.

FIGS. 13-16 show a first half ("rising" half) of a flame simulation based on a combination a perpetual middle simulation and a rising spark simulation within a simulation period from time T1 to time T4. In the first half of the simulation period, the brightness of the perpetual middle and the rising spark are added together and the summed LEDs brightness values are sent to the LEDs in form of electricity at T1, T2, T3, and T4 to actuate the LEDs. FIGS. 17-21 show a second half ("contracting" half) of a flame simulation based on a combination a perpetual middle simulation and a contracting spark simulation within a simulation period from time T5 to time T9. In the second half of the simulation period, the brightness of the perpetual middle and the contracting spark are added together and the summed LEDs brightness values are sent to the LEDs in form of electricity at T5, T6, T7, T8, and T9 to actuate the LEDs. The brightness values of flames/sparks/perpetual middles may be one or more LED control integers or percentages. In some embodiments of a single flame simulation, at time T9, the values of the spread of a single simulated flame/spark/perpetual middle, its brightness, and the rate at which its center increases all changes until they are similar to what they were at time T1, which signals the end of current flame simulation period and also the start of next flame simulation period. In other embodiments of multiple flames simulations, at time T9, those values may change to other numbers, integers, or percentages different from what they were at time T1.

FIG. 13 shows an example of a flame simulation combining a perpetual middle simulation and a rising spark simulation at time T1. It is the start of the first half ("rising" half) of the flame simulation period. The perpetual middle has a brightest center positioned near row 4 and a spread of approximately 3 rows. The spark center starts below row 1' and moves upward. The upper end of the spark spread reaches row 1', thus LEDs of row 2' through row 10' are not actuated at time T1. The brightness of the spark starts to increase from this time on. The simulated flame combines the simulated perpetual middle and the simulated spark, and thus has a brightest center positioned near row 4". The brightness of the simulated flame starts to increase as the spark center continues to move upward.

Figure 14:
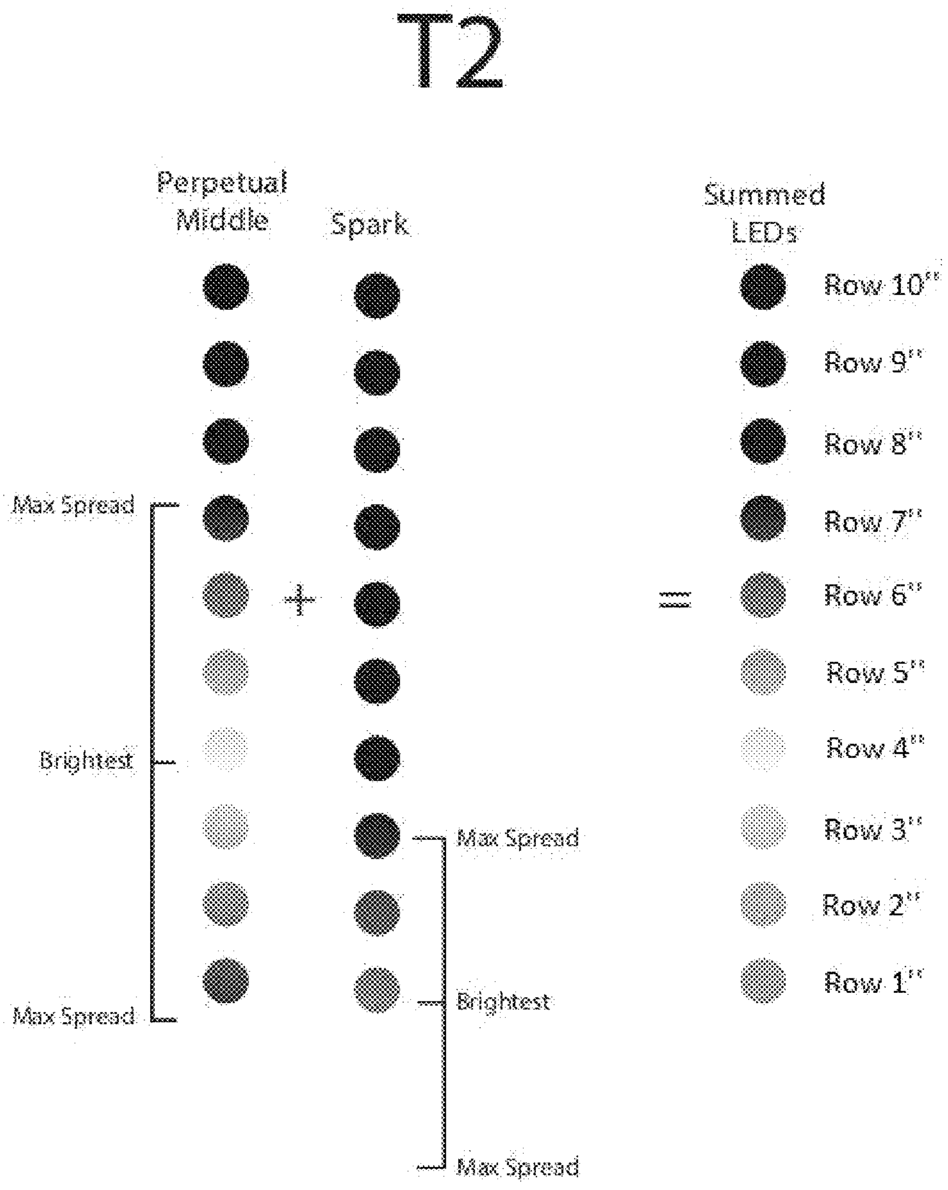
FIG. 14 is an example of a flame simulation combining a perpetual middle simulation and a rising spark simulation at time T2.

FIG. 14 shows an example of a flame simulation combining a perpetual middle simulation and a rising spark simulation at time T2. The perpetual middle at time T2 remains substantially the same as that at time T1. The spark center now reaches row 1'. The upper end of the spark spread reaches row 3'. The simulated flame combines the simulated perpetual middle and the simulated spark, and thus has a brightest center near row 4". The brightness of the simulated spark and the simulated flame keep increasing as the spark center continues to move upward.

Figure 15:
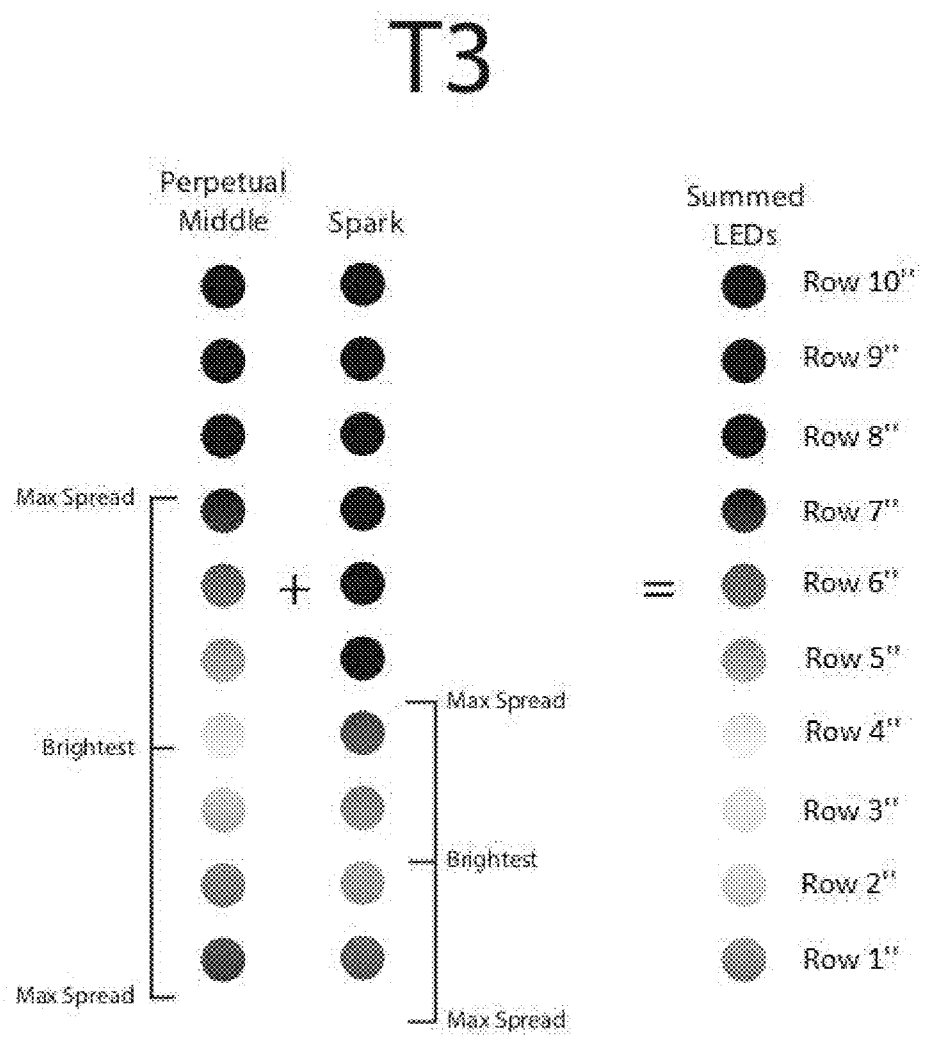
FIG. 15 is an example of a flame simulation combining a perpetual middle simulation and a rising spark simulation at time T3.

FIG. 15 shows an example of a flame simulation combining a perpetual middle simulation and a rising spark simulation at time T3. The perpetual middle at time T3 remains substantially the same as that at time T2. The spark center now passes row 2'. The upper end of the spark spread passes row 4' and the lower end of the spark is below row 1'. The simulated flame combines the simulated perpetual middle and the simulated spark, and has a brightest center positioned between row 3" and row 4". The brightness of the simulated spark and the simulated flame keep increasing as the spark center continues to move upward.

Figure 16:
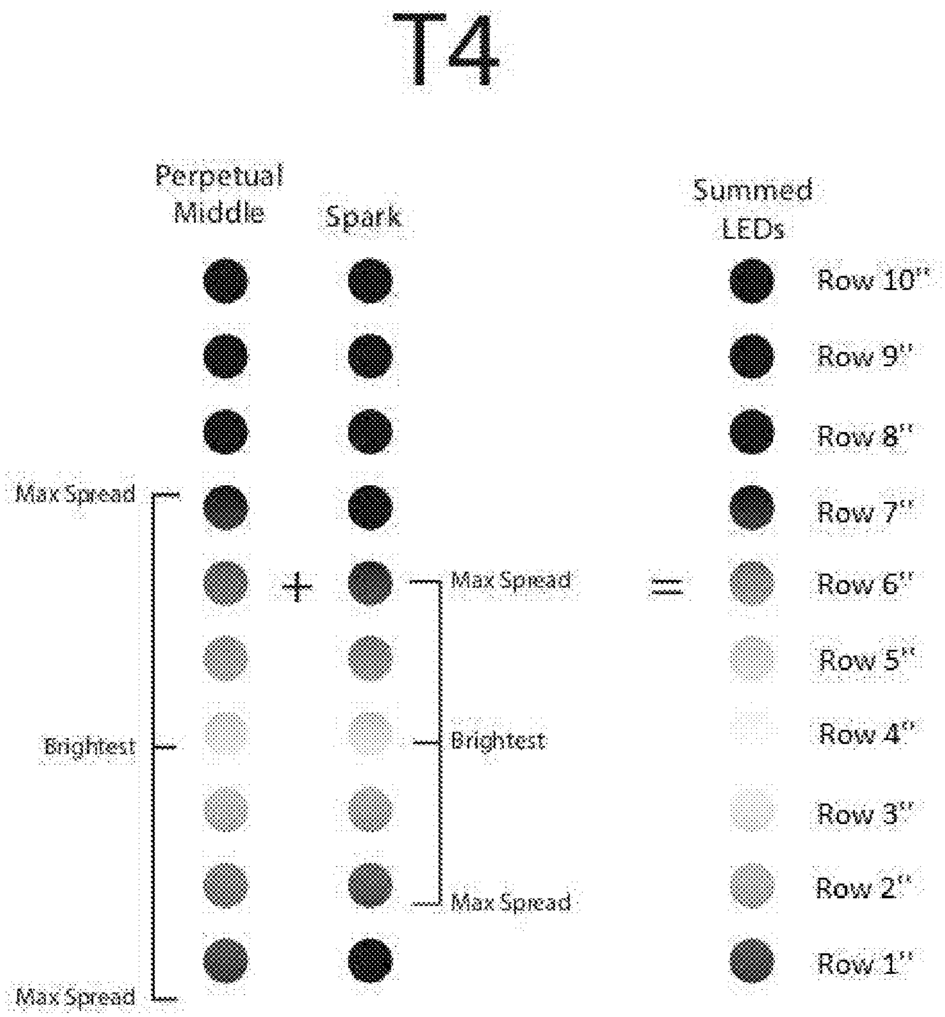
FIG. 16 is an example of a flame simulation combining a perpetual middle simulation and a rising spark simulation at time T4.

FIG. 16 shows an example of a flame simulation combining a perpetual middle simulation and a rising spark simulation at time T4. It is the end of the first half ("rising" half) of the flame simulation period. The perpetual middle at time T4 remains substantially the same as that at time T3. The spark center continues to move upward and reaches row 4'. The upper end of the spark spread reaches row 6' and the lower end of the spark is reaches row 2'. The brightness of the spark keeps increasing and reaches its peak value in the first half of the simulation period from time T1 to time T4. It is to be understood that while the spread of the spark remains relatively constant in the rising spark simulation from time T1 to time T4, its value may vary randomly or automatically according to pre-set programs or manual inputs. The simulated flame combines the simulated perpetual middle and the simulated spark, and has a brightest center positioned near row 4". Similar to the brightness of the simulated spark, the brightness of the simulated flame keeps increasing and reaches its peak value in the simulation period from time T1 to time T4.

Figure 17:
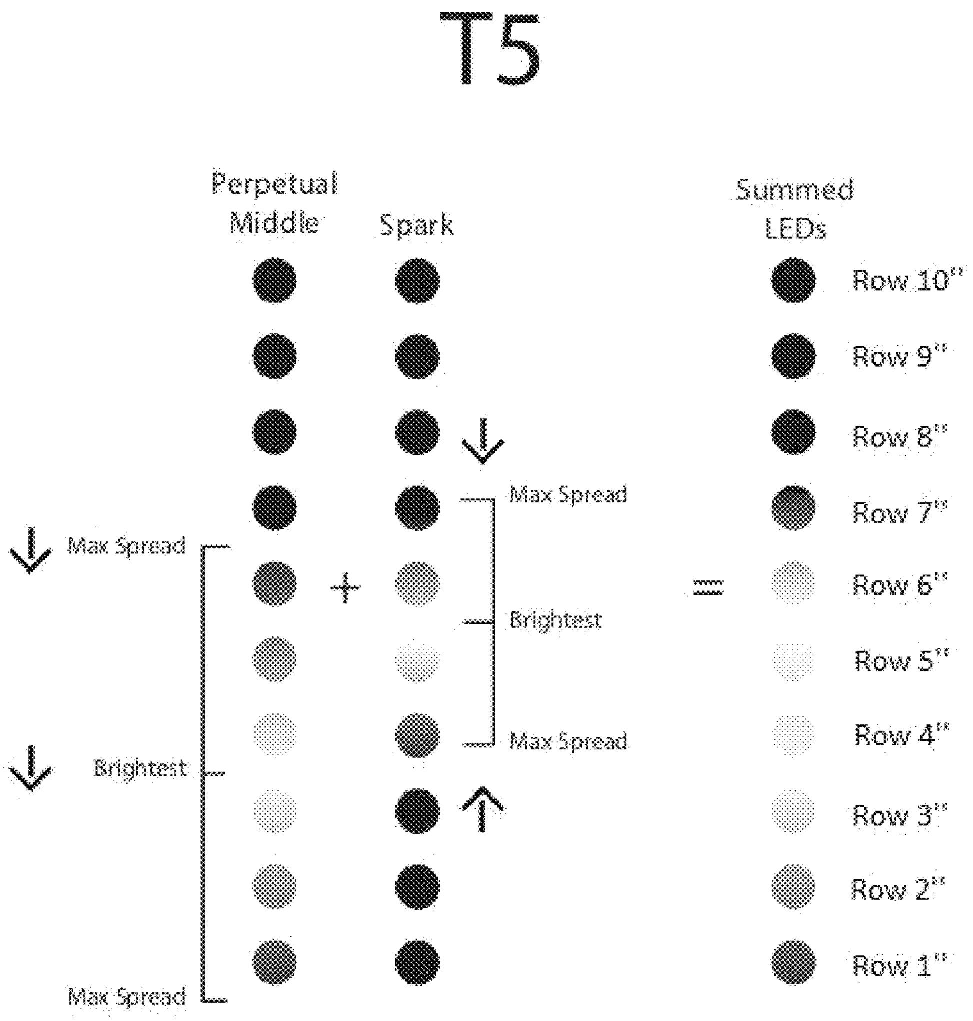
FIG. 17 is an example of a flame simulation combining a perpetual middle simulation and a contracting spark simulation at time T5.

FIG. 17 shows an example of a flame simulation combining a perpetual middle and a contracting spark at time T5. It is the start of the second half ("contracting" half) of the flame simulation period. The perpetual middle at time T5 starts to decrease in brightness and spread, and has a brightest center positioned between row 3 and row 4. The spark center continues to move upward and passes row 5'. The spread of the spark starts to decrease as the spark center continues to move upward. The simulated flame combines the simulated perpetual middle and the simulated spark, and the brightest center of the flame starts to split as the brightest center of the perpetual middle and the brightest center of the spark moves in opposite directions.

Figure 18:
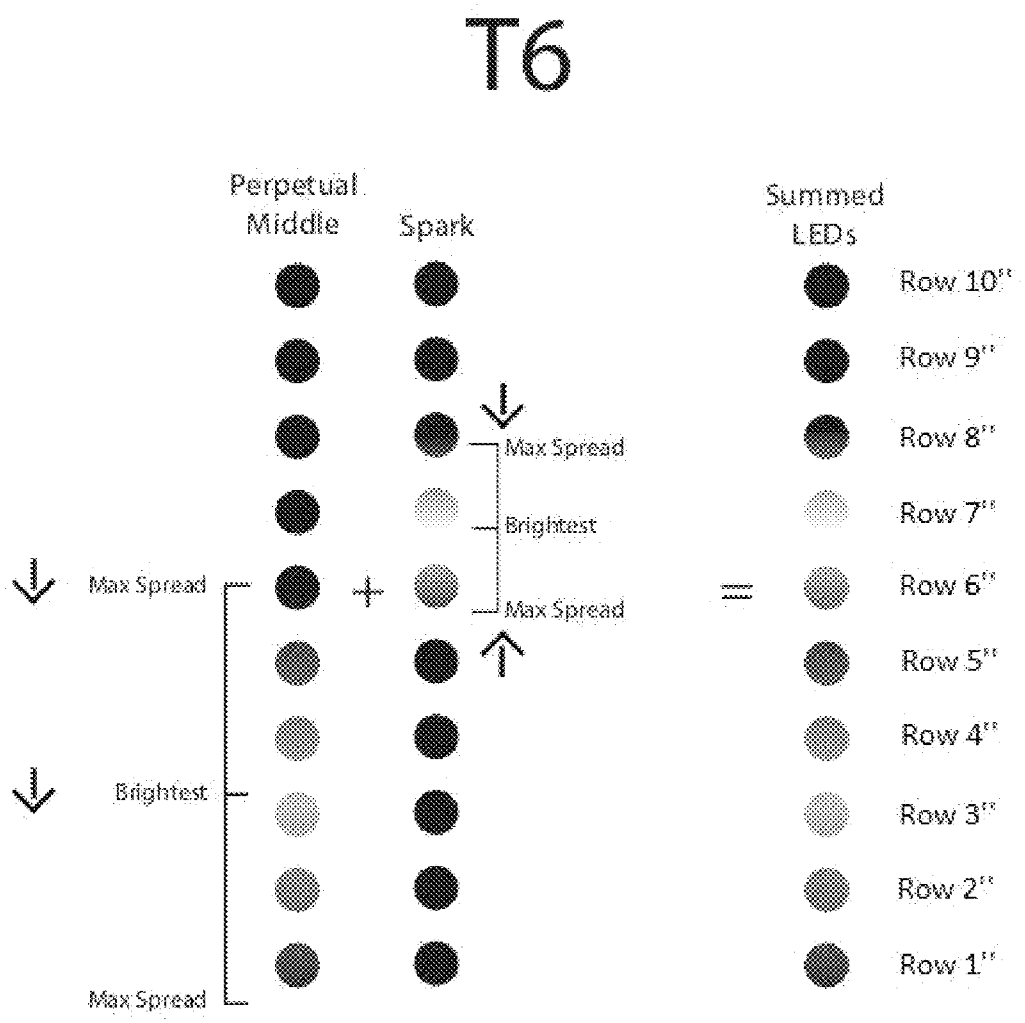
FIG. 18 is an example of a flame simulation combining a perpetual middle simulation and a contracting spark simulation at time T6.

FIG. 18 shows an example of a flame simulation combining a perpetual middle and a contracting spark at time T6. The perpetual middle at time T6 keeps decreasing in brightness and spread, and has a brightest center positioned near row 3. The spark center continues to move upward and reaches row 7'. The spread of the spark keeps decreasing as the spark center continues to move upward. The simulated flame combines the simulated perpetual middle and the simulated spark. The brightest center of the flame at time T5 splits into two bright parts at time T6. The upper bright part continues to move upward to be near row 7" and the lower bright part continues to move downward to be near row 3".

Figure 19:
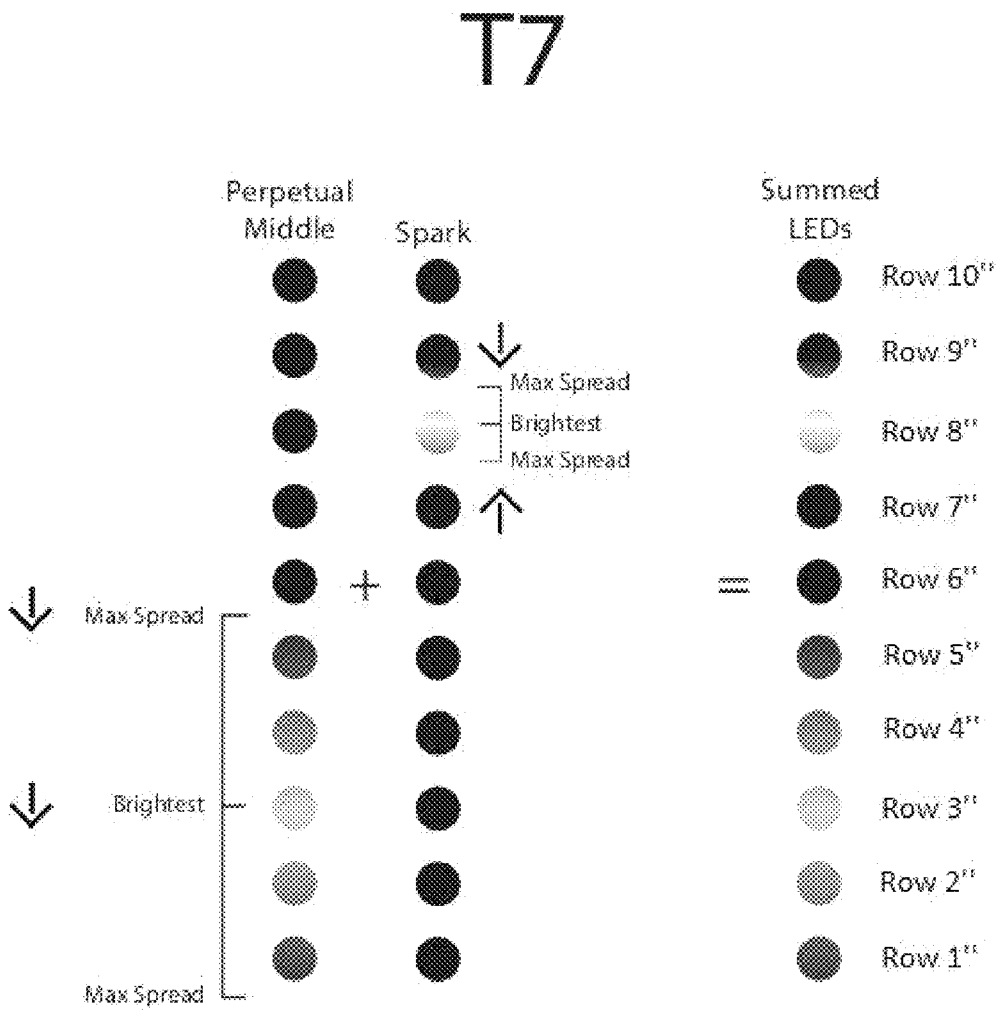
FIG. 19 is an example of a flame simulation combining a perpetual middle simulation and a contracting spark simulation at time T7.

FIG. 19 shows an example of a flame simulation combining a perpetual middle and a contracting spark at time T7. The perpetual middle at time T7 keeps decreasing and reaches the minimum in brightness and spread. The brightest center of the perpetual middle is near row 3. The spark center continues to move upward and reaches row 8'. The spread of the spark keeps decreasing as the spark center continues to move upward. The simulated flame combines the simulated perpetual middle and the simulated spark, and has two bright parts. The upper bright part of the flame continues to move upward to reach row 8" and the lower bright part continues to move downward to be near row 3".

Figure 20:
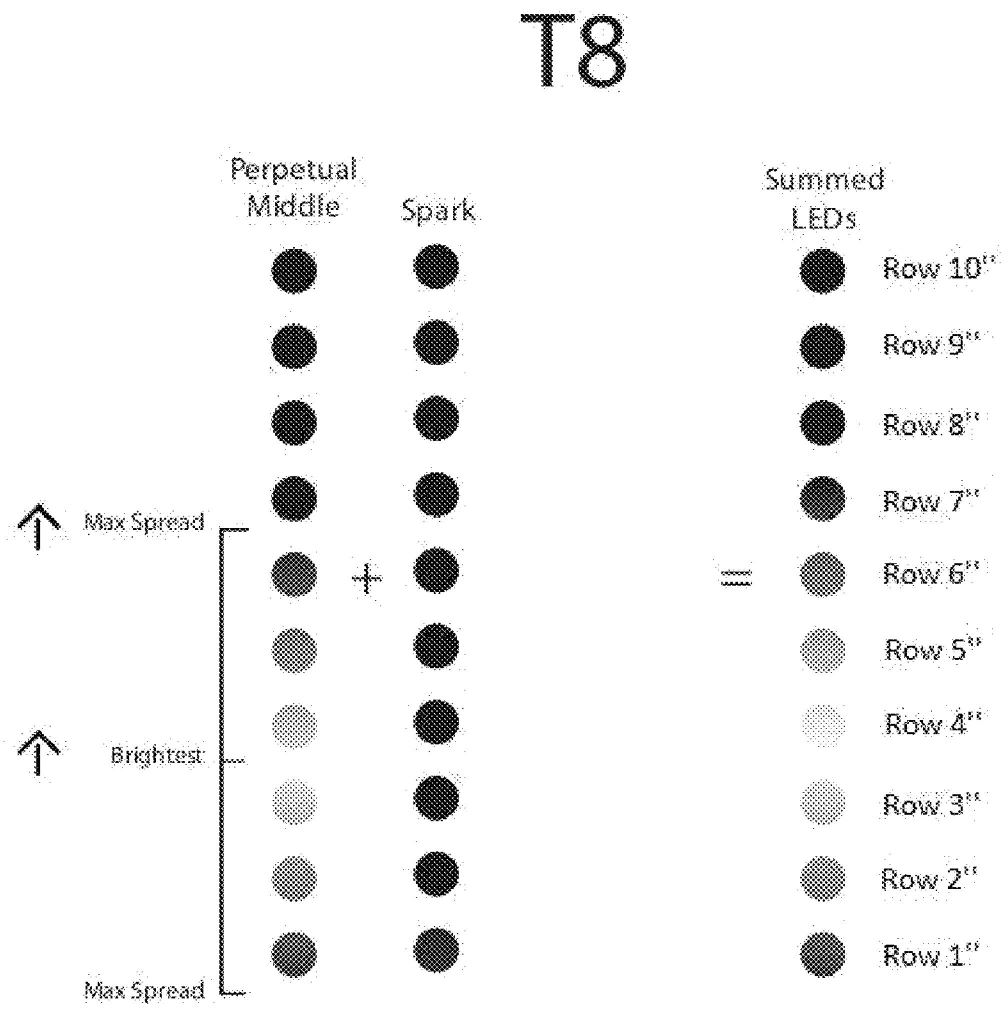
FIG. 20 is an example of a flame simulation combining a perpetual middle simulation and a contracting spark simulation at time T8.

FIG. 20 shows an example of a flame simulation combining a perpetual middle and a contracting spark at time T8. The perpetual middle at time T8 starts to increase in brightness and spread, and has a brightest center positioned between row 3 and row 4. The simulated spark terminates and the spread of the simulated spark shrinks to zero at time T8. The simulated flame is similar to the simulated perpetual middle because the simulated spark is now terminated.

Figure 21:
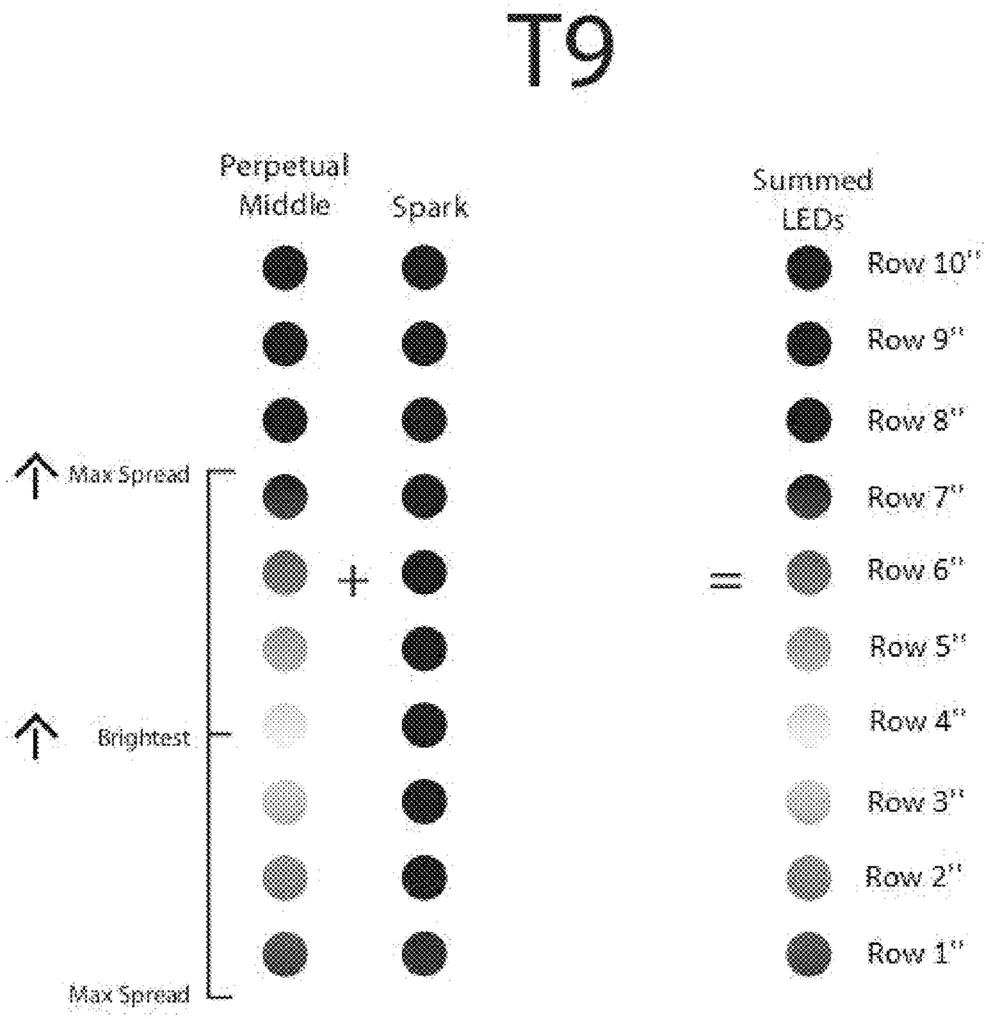
FIG. 21 is an example of a flame simulation combining a perpetual middle simulation and a contracting spark simulation at time T9.

FIG. 21 shows an example of a flame simulation combining a perpetual middle and a contracting spark at time T9. It is the end of the second half ("contracting" half) of the flame simulation period. The perpetual middle at time T8 keeps increasing and reaches peak values in brightness and spread similar to those at time T1. In addition, the perpetual middle has a brightest center positioned near row 4, also similar to that at time T1. There is no simulated spark at time T9 like at time T8, and the simulated flame is similar to the simulated perpetual middle.

It is to be understood that while the brightness of the simulated spark remains relatively constant in the contracting spark simulation from time T5 to time T7, its value may vary randomly or automatically according to pre-set programs or manual inputs. For example, the brightness may decrease from time T5 to time T7.

It is to be understood that a "row" of lighting units (e.g., LED) may refer to a horizontal grouping of multiple lighting units but is not necessarily limited to such horizontal groupings. In embodiments, a "row" may include different horizontal or vertical positions of a single lighting unit or multiple lighting units in combination. In one embodiment, a single lighting unit may comprise multiple lighting portions arranged vertically and/or horizontally, and these portions may be actuated individually or in combination. In this case, different rows may refer to different portions of a single lighting unit individually or in combination, rather than different lighting units individually or in combination. The lighting units (or lighting portions of a single lighting unit) may be actuated based on positioning relative to other lighting units (or lighting portions of a single lighting unit). For example, as described herein, values may be passed "upwards" from one row to the next. However, where the LEDs are not positioned in true "rows", the values may be passed from an LED having a lower position (e.g., vertical position) to an LED having a higher position (e.g., vertical position). Each LED may be configured to determine its distance relative to one or more nearby LEDs, and values may be passed from one LED to another based on the relative positioning of LEDs. As the values gain altitude, X and Y values corresponding to wind point may additionally be prescribed.

According to still further embodiments of the invention, a flame may be simulated by alternately, or further incorporating a meander feature that allows an LED display to appear as though the flame is dancing or bouncing. The meander feature may be accomplished by randomly changing the height of the perpetual middle. Although the perpetual middle is by definition perpetual in nature, changes in the properties of the perpetual middle such as maximum spread, center, and brightness can enhance the effect of the display. More specifically, by altering various properties of the perpetual middle, the flame can more accurately mimic the dancing or bouncing exhibited by a real flame.

Figure 22:
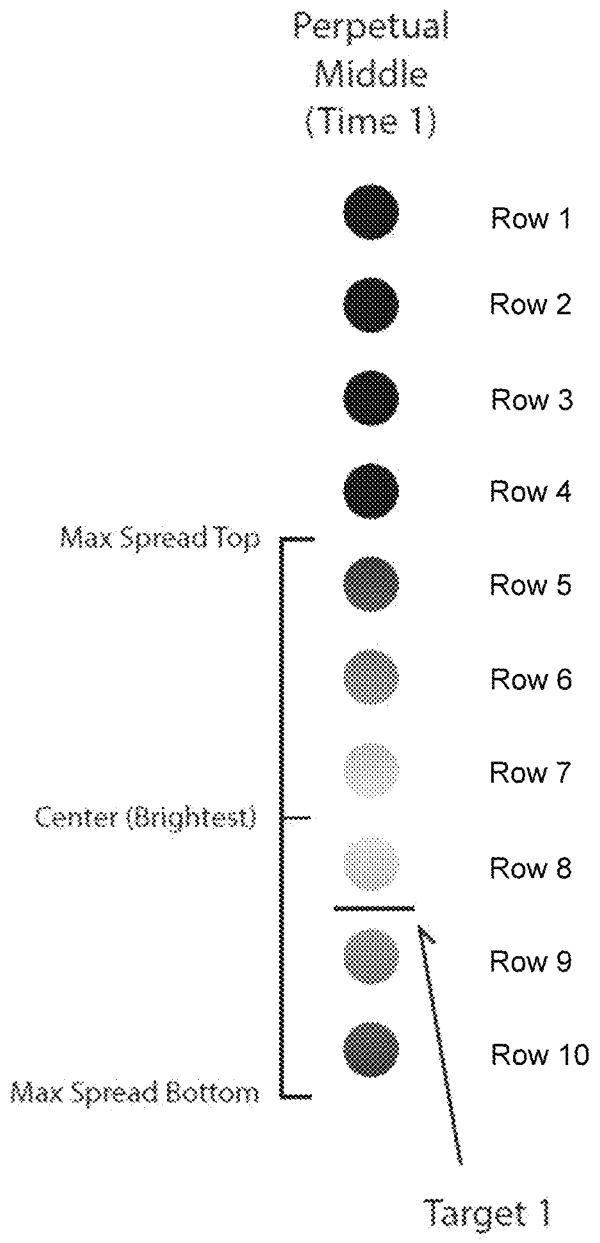
FIG. 22 illustrates a flame simulation of a perpetual middle simulation with a meander simulation at time T1.

FIGS. 22-27 illustrate a perpetual middle simulation when combined with a meander simulation effect. The perpetual middle simulation is described immediately above with reference to FIG. 12. FIG. 22 shows the perpetual middle at time 1 (T1). The brightest point along the line of LEDs occurs at the center, or between LED rows 7 and 8. The brightness decreases towards the top of the max spread and the bottom of the max spread. The meander simulation effect causes the center (i.e., the brightest point) to randomly change to create the dancing effect of a real flame. A value for a target (Target 1 in FIG. 22) may be randomly selected by the code. Additionally, a value for acceleration is randomly selected by the code. As described herein, acceleration is defined as the change in height of the center from time 1 (T1) to time 2 (T2). Acceleration may be positive or negative depending on the value for the target. Here, Target 1 is below the center, so the defined value for acceleration is negative, causing the perpetual middle to squat lower towards Target 1.

Figure 23:
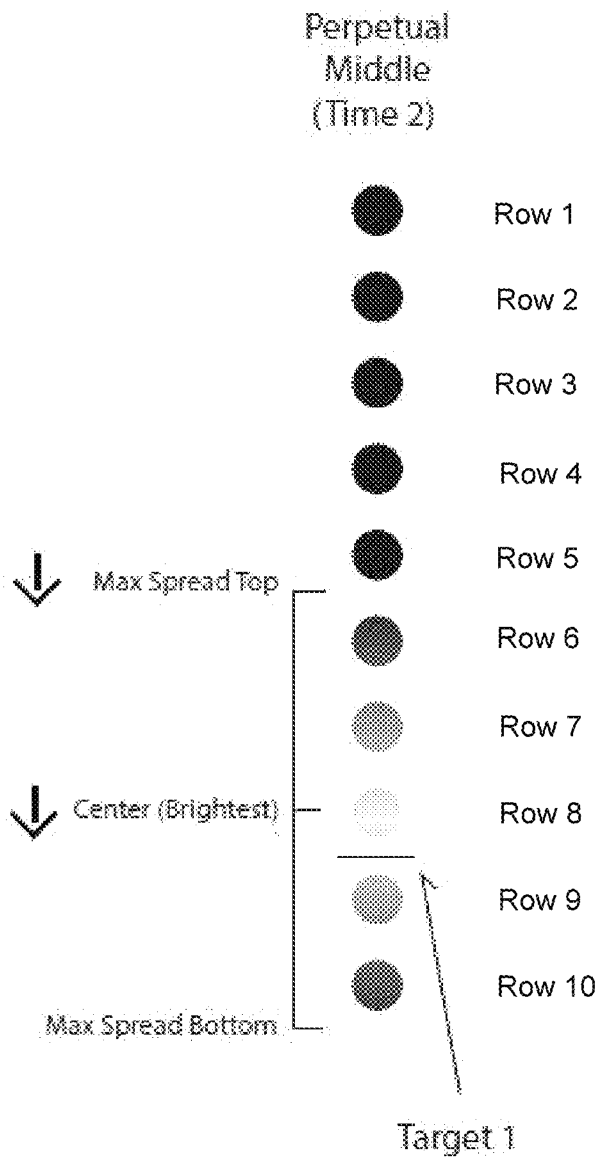
FIG. 23 illustrates a flame simulation of a perpetual middle simulation with a meander simulation at time T2.

FIG. 23, illustrating time 2 (T2), shows that the center and the top of the max spread have moved down towards Target 1 according to the defined acceleration value. The center is still equidistant from the top and bottom of the max spread. In most cases where the acceleration is negative the bottom of the max spread will not change altitude, or height. Rather, the top of the max spread will decrease toward the defined target. Similarly, where the acceleration is positive, the top of the max spread will in most cases not change altitude, but instead the bottom of the max spread will increase toward the defined target.

Figure 24:
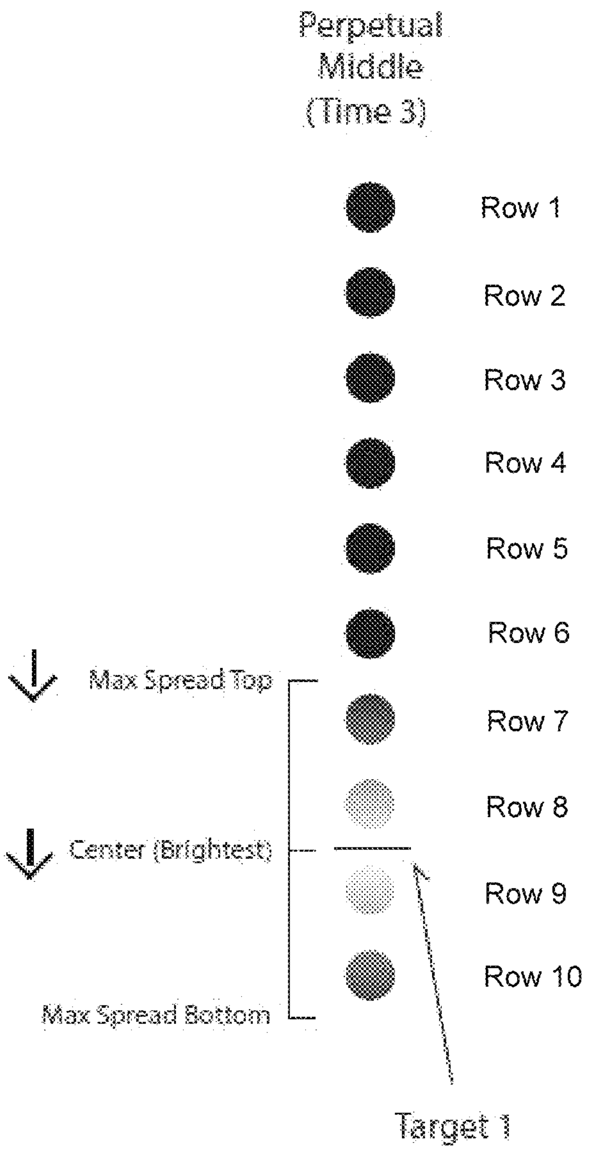
FIG. 24 illustrates a flame simulation of a perpetual middle simulation with a meander simulation at time T3.

Moving on, at time 3 (T3), illustrated in FIG. 24, the center and the top of the max spread have moved down towards Target 1 a distance equal to the value of acceleration. Here again, the center is equidistant from the top and the bottom of the max spread. At T3, the center reaches Target 1. When the center is less than or equal to Target 1, the code randomly selects a new value for a target (Target 2). The new target value must be within a defined range, here, between max range top and max range bottom. Because the center is below or equal to the max range bottom, Target 2 must be defined at a higher altitude than Target 1. A new value for acceleration may be selected by the program as well, or the value for acceleration may stay the same (though the value may be positive or negative depending on the value of the target).

Figure 25:
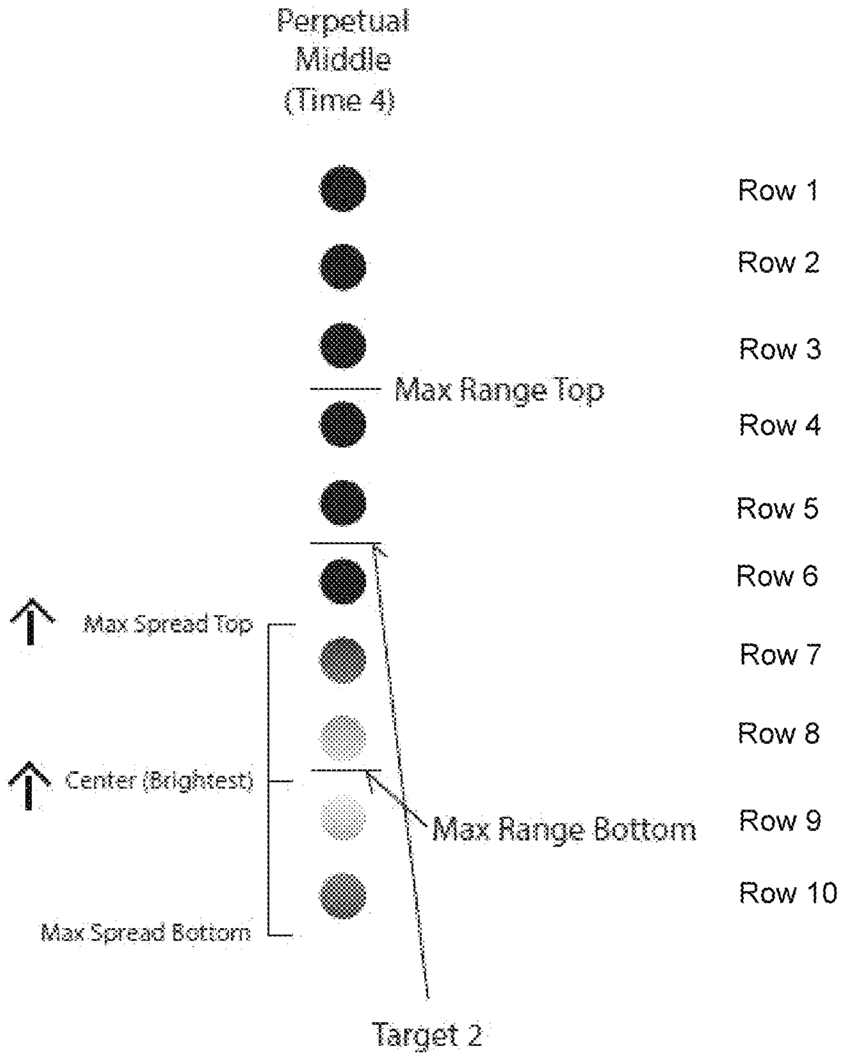
FIG. 25 illustrates a flame simulation of a perpetual middle simulation with a meander simulation at time T4.
Figure 26:
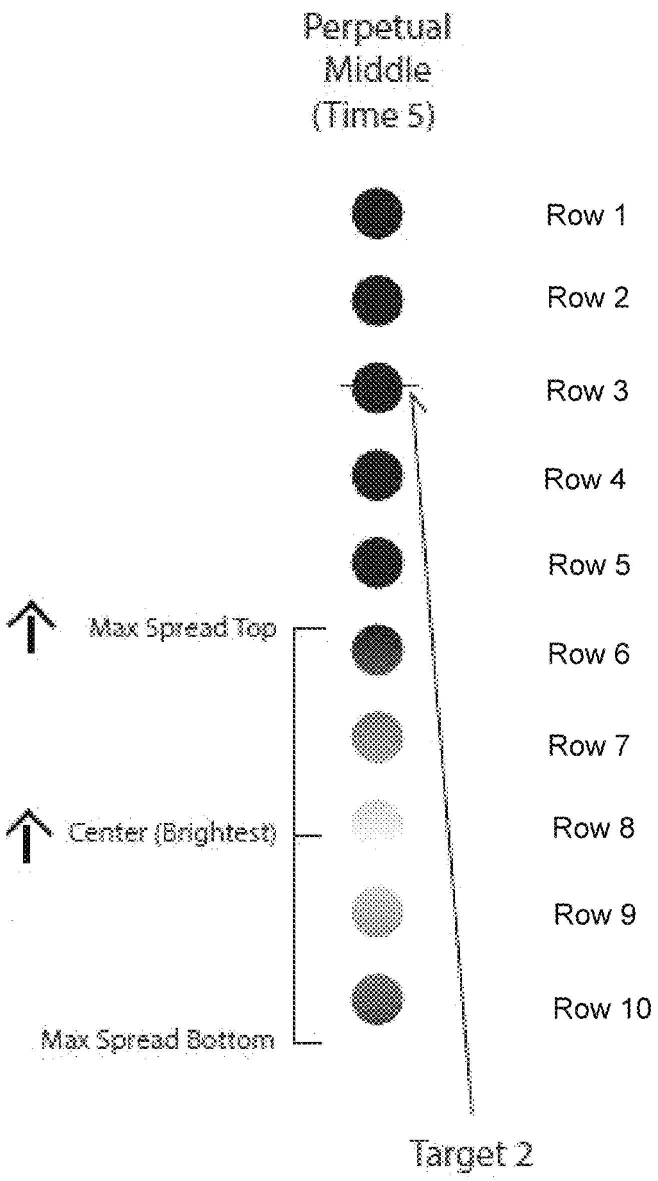
FIG. 26 illustrates a flame simulation of a perpetual middle simulation with a meander simulation at time T5.
Figure 27:
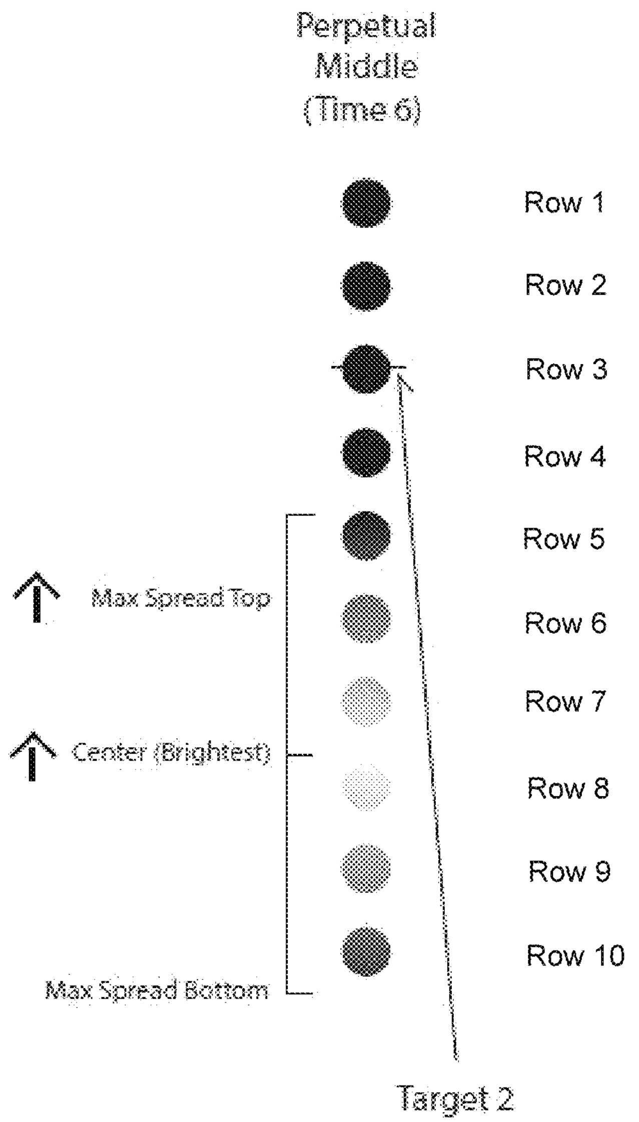
FIG. 27 illustrates a flame simulation of a perpetual middle simulation with a meander simulation at time T6.

FIG. 25 illustrates the simulation at time 4 (T4). Here, the code has selected a value for Target 2, which has a higher altitude than Target 1. Accordingly, the acceleration value must be positive. Moving on to time T5, as shown in FIG. 26, the center has moved upwards towards Target 2 a distance equal to the value of acceleration. Again at time T6, as shown in FIG. 27, the center has moved upwards to Target 2. Since the center has reached Target 2, a new target value, and optionally an acceleration value, will be randomly selected by the code, and the center will react accordingly.

The meander simulation effect may work in conjunction with various other simulation effects. For example, the meander simulation may be combined with the spark simulation. In such a combination, the height of the perpetual middle center at any given time will affect the time at which the sparks may begin contracting. The trigger to start the contracting of the spark may be, for example, when the center of the spark passes through the center of the perpetual middle or passes very close to the perpetual middle (e.g., center*1.3 or center*0.7).

While the meander simulation is described in one-dimension, it shall be understood that the simulation can be run in two- or three-dimensions to more accurately simulate a flame.

As described herein simulating the presence of wind can help to accurately mimic flame movement. A candle will generally exhibit soft, smooth changes in brightness and movement when little to no wind is present. However, when a high amount of wind is present, the candle will appear to flash or flicker more rapidly. As it relates to further embodiments of the invention, wind speed is a variable that may change over time similar to the way the perpetual middle center meanders according to the meander simulation described immediately above.

FIGS. 28-31 illustrate an exemplary embodiment of a flame simulation based on a combination of a perpetual middle simulation, a spark simulation, and a wind variable simulation within a simulation period from time T1 to time T30. For purposes of illustrating, the perpetual middle and the spark contract in each time period remains static in height and spread. However, it shall be understood that during a particular time period, many sparks would pass through the perpetual middle and contract. Moreover, the perpetual middle center may meander over time as described immediately above.

Figure 28:
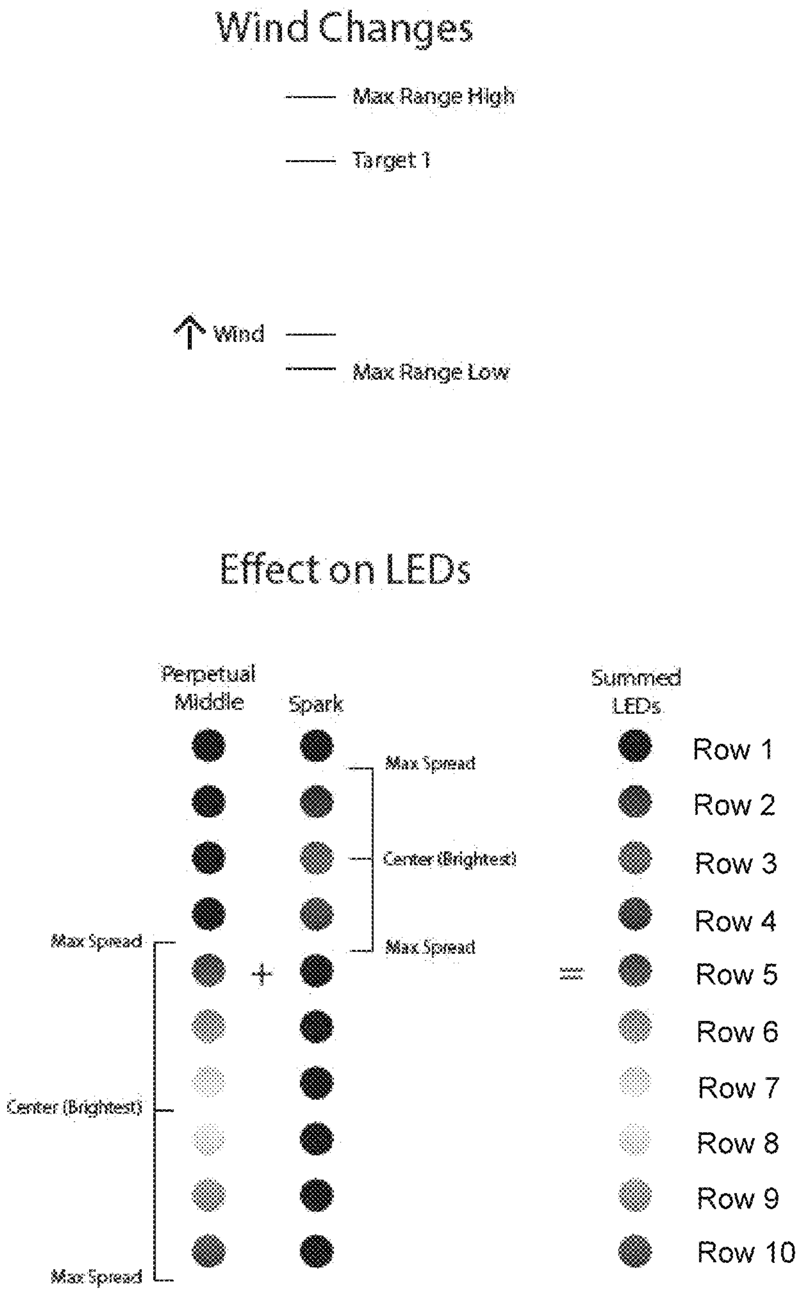
FIG. 28 illustrates a flame simulation of a perpetual middle simulation with a spark simulation and a meander simulation at time T1.

For the wind variable simulation, a wind speed value may be randomly chosen by the program. In FIG. 28, the wind speed value is very low to represent a flame that is only slightly affected by wind. However, the wind speed is increasing toward Target 1. As with the meander simulation, the value for a target, in this case Target 1, is randomly selected by the program, and must fall within a maximum range. The increase in wind speed is according to a set rate of wind acceleration, which may be set by the program or randomly selected. As with the acceleration of the perpetual middle center, the wind acceleration is either positive or negative depending on whether the wind speed is increasing (representing a positive wind speed acceleration) or decreasing (representing a negative wind speed acceleration). In FIG. 28, because the wind speed value is low, the perpetual center is at near full brightness (between LED rows 7 and 8), and the sparks passing through are very dim. The summed result of the perpetual middle and the spark simulations with low wind speed is a simulated flame that appears very stead with minimal flickering effect.

Figure 29:
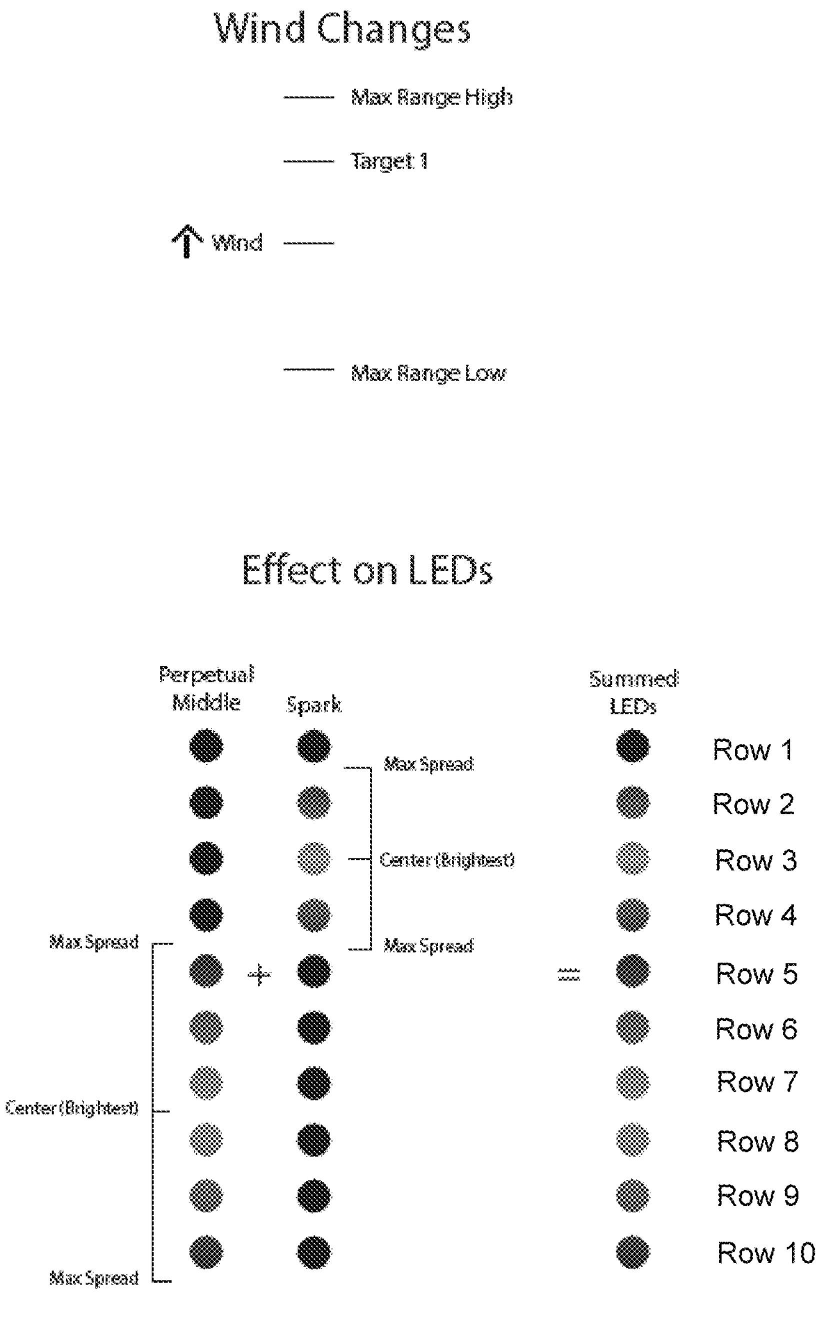
FIG. 29 illustrates a flame simulation of a perpetual middle simulation with a spark simulation and a meander simulation at time T10.

FIG. 29, representing time T10, shows that the wind speed has increased at the rate of wind acceleration. As a result, the perpetual middle center between LEDs 7 and 8 appears dimmer, while the sparks passing through the perpetual middle have increased brightness. This change in brightness gives the impression of more flickering as would be expected with an increase in wind speed.

Figure 30:
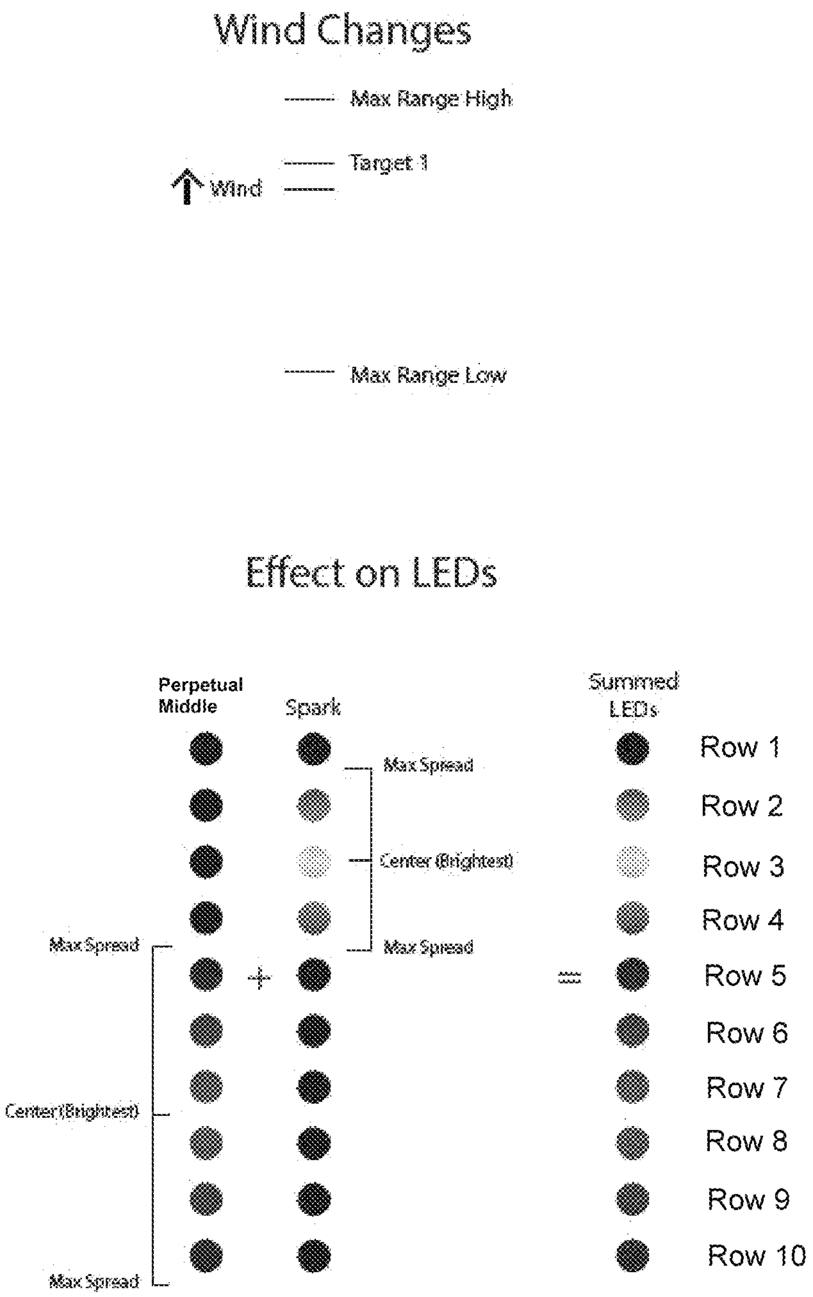
FIG. 30 illustrates a flame simulation of a perpetual middle simulation with a spark simulation and a meander simulation at time T20.
Figure 31:
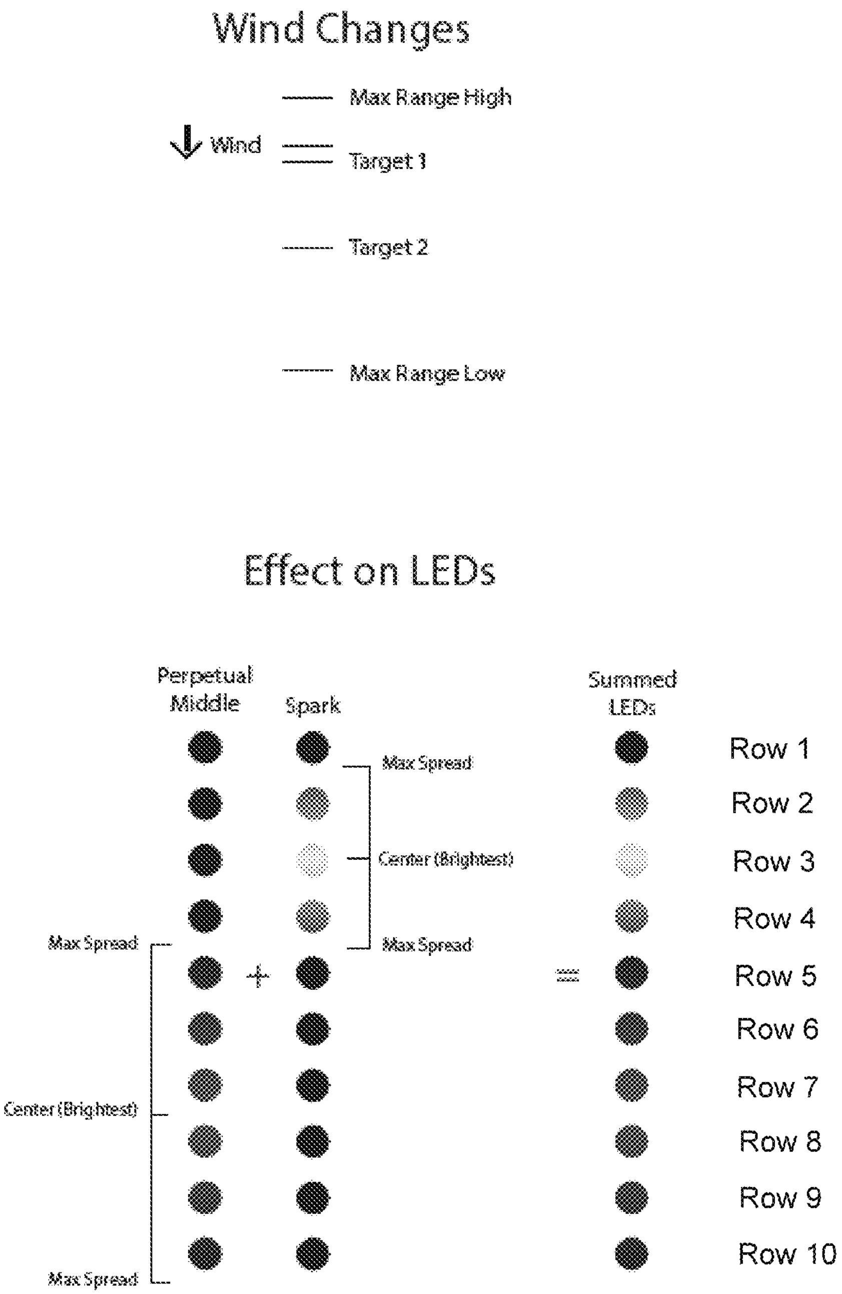
FIG. 31 illustrates a flame simulation of a perpetual middle simulation with a spark simulation and a meander simulation at time T30.

Again in FIG. 30, representing time T20, the wind speed has increased at the rate of wind acceleration. As a result, the perpetual middle center between LEDs 7 and 9 appears still dimmer than at time T10, and the spark pass through the perpetual middle has increased brightness. The result is the impression of even more flickering.

At time T30, represented in FIG. 3I, the wind value has again increased, and has in fact passed Target 1. This causes the program to randomly select a new target value, here identified as Target 2. A new value for wind acceleration may additionally be defined and must in this case be negative since Target 2 is below the current wind speed value. Moving from time T30 to time T40 (for example), the wind speed value will decrease at the new rate of wind acceleration until it reaches Target 2. Once the wind speed value has reached Target 2, a new target wind speed value will be randomly selected by the program, as well as a wind acceleration, value, and the process will continue.

In addition to randomly selecting new target and wind acceleration values once the wind speed passes a target, the program may change values related to the simultaneously operating spark simulation (e.g., the rate at which new sparks are ignited) and/or the perpetual middle meander simulation (e.g., the acceleration of the meander function, the max range top, max range bottom, et cetera). For example, increasing the wind speed may cause the program to increase the value for acceleration as it relates to the perpetual middle meander simulation, and the total range between the maximum top and bottom may additionally be increased. Transversely, a lower wind speed value may cause the program to decrease the value for acceleration as it relates to the perpetual middle meander simulation, and the total range between the maximum top and the bottom may be decreased.

It shall be understood that the wind speed value may accelerate or decelerate towards a rand target set by the program as described herein, but in some embodiments, the wind value may be controlled using hardware sensors such as sound sensors, accelerometers, motion sensors, or other sensors. When the sensor(s) detect(s) a particular event, the program may increase or decrease the wind speed accordingly. For example, where a sound sensor is utilized, if the sensor detects higher overall levels of sound amplitude (i.e., the amplitude may be averaged over time), the wind speed value may increase; conversely, if the sensor detects lower overall values of sound amplitude, the wind speed value may decrease.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described unless specified.

The invention claimed is:

1. A method for visually simulating a spark, comprising:
initiating a plurality of a first set of LEDs to simulate a flame having a perpetual middle;
initiating a plurality of a second set of LEDs to simulate a spark moving in a first direction from the perpetual middle of the flame, the spark having a spark range; and
while initiating the plurality of the first set of LEDs to simulate the flame, reducing an intensity of at least one LED within the spark range such that the spark is visually distinct from the flame.

2. The method of claim 1, further comprising:
while initiating the plurality of the first set of LEDs to simulate the flame, at least partially reducing an intensity of one or more LEDs of the plurality of the second set of LEDs to simulate a decrease in intensity of the spark, and at least partially reducing an intensity of one or more LEDs of the plurality of the first set of LEDs to simulate an increase in intensity of the flame.

3. The method of claim 2, wherein, for a predetermined time increment, all LEDs between the flame and the spark range are initiated such that the spark is at least temporarily visually attached to the flame.

4. The method of claim 1, wherein, for a predetermined time increment, all LEDs between the flame and the spark range are initiated such that the spark is at least temporarily visually attached to the flame.

5. The method of claim 1, further comprising:
while initiating one or more LEDs to simulate the flame, at least partially reducing an intensity of one or more LEDs to simulate a reducing in intensity of the spark, and at least partially reducing an intensity of one or more LEDs to simulate movement of the spark.

6. The method of claim 5, wherein, for a predetermined time increment, all LEDs between the flame and the spark range are actuated such that the spark is at least temporarily visually associated with the flame.

7. The method of claim 1, further comprising adjusting a height of the perpetual middle of the flame.

8. The method of claim 1, wherein the LEDs are disposed in a single vertical column.

9. A method for visually simulating a spark, comprising:
initiating one or more LEDs to simulate a flame having a spread with opposing first and second ends;
initiating one or more LEDs to simulate a spark such that a distance between a first point of the spark and the first end of the flame increases, the spark having a spark range within which one or more LEDs are at least partially actuated; and
while initiating one or more LEDs to simulate the flame, at least partially reducing an intensity of at least one LED within the spark range such that the spark is visually distinct from the flame.

10. The method of claim 9, wherein, for a predetermined period of time, all LEDs between the flame and the spark range are initiated such that the spark is at least temporarily visually associated with the flame.

11. The method of claim 10, wherein:
while initiating one or more LEDs to simulate the flame, at least partially reducing an intensity of one or more LEDs to simulate an intensity decrease of the spark, and at least partially reducing an intensity of one or more LEDs to simulate movement of the spark.

12. The method of claim 11, wherein, for a predetermined period of time, all LEDs between the flame and the spark range are initiated such that the spark is at least temporarily visually associated with the flame.

13. The method of claim 9, wherein:
while initiating one or more LEDs to simulate the flame, at least partially reducing an intensity of one or more LEDs to simulate an intensity decrease of the spark, and at least partially reducing an intensity of one or more LEDs to simulate movement of the spark.

14. The method of claim 9, further comprising:
while initiating one or more LEDs to simulate the flame, at least partially reducing an intensity of one or more LEDs to simulate an intensity decrease of the spark, and at least partially increasing an intensity of one or more LEDs to simulate a brightness increase of the flame.

15. The method of claim 9, wherein a shroud encases the LEDs.

16. A method of controlling a lighting device, comprising:

providing a substrate having opposed first and second sides, a plurality of first LEDs arranged on the first side, a plurality of second LEDs arranged on the second side, a respective LED of the plurality of first LEDs and a respective LED of the plurality of second LEDs forming an LED pair;

initiating one or more LED pairs to simulate a flame having a spread, the flame spread having an opposed first and second ends;

initiating one or more LED pairs to simulate a spark such that a distance between an upper point of the spark and the first end of the flame is increased, the spark having a spark range within which one or more LED pairs are at least partially initiated; and while initiating one or more LED pairs to simulate the flame, at least partially reducing an intensity of at least one LED pair within the spark range such that the spark is visually detached from the flame.

17. The method of claim 16, wherein the plurality of first LEDs includes at least three LEDs, and wherein the plurality of second LEDs includes at least three LEDs thereby forming three LED pairs.

18. The method of claim 16, wherein the plurality of first LEDs is arranged in a generally vertical column on the first side.

19. The method of claim 18, wherein the plurality of second LEDs is arranged in a generally vertical column on the second side.

20. The method of claim 16, further comprising:

while initiating one or more LED pairs to simulate the flame, at least partially reducing an intensity of one or more LED pairs to simulate a decrease in intensity of the spark, and at least partially increasing an intensity of one or more LED pairs to simulate an increase in intensity of the flame.

* * * * *